United States Patent
Bruce et al.

(10) Patent No.: US 7,860,646 B2
(45) Date of Patent: Dec. 28, 2010

(54) METHOD AND APPARATUS FOR ROUTING OCEAN GOING VESSELS TO AVOID TREACHEROUS ENVIRONMENTS

(75) Inventors: Alan E. Bruce, Kent, WA (US); Daniel J. Gadler, Mercer Island, WA (US); Kyle M. Nakamoto, Bellevue, WA (US); Ken Cobleigh, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 906 days.

(21) Appl. No.: 11/735,831

(22) Filed: Apr. 16, 2007

(65) Prior Publication Data

US 2008/0255757 A1      Oct. 16, 2008

(51) Int. Cl.
*G01C 21/00* (2006.01)

(52) U.S. Cl. .......... 701/202; 701/209; 701/210

(58) Field of Classification Search .......... 701/1, 701/23, 26, 200–213, 300; 340/901, 905, 340/984, 985
See application file for complete search history.

(56) References Cited

U.S. PATENT DOCUMENTS

| | | | |
|---|---|---|---|
| 6,014,606 A * | 1/2000 | Tu .......... | 701/200 |
| 6,085,147 A * | 7/2000 | Myers .......... | 701/209 |
| 6,285,951 B1 | 9/2001 | Gaskins et al. | |
| 6,691,007 B2 | 2/2004 | Haugse et al. | |
| 6,917,860 B1 | 7/2005 | Robinson et al. | |
| 2001/0029425 A1 | 10/2001 | Myr | |
| 2003/0236818 A1 | 12/2003 | Bruner | |
| 2004/0030493 A1 | 2/2004 | Pechatnikov | |
| 2006/0241855 A1 | 10/2006 | Joe et al. | |
| 2006/0242108 A1 | 10/2006 | Cuspard et al. | |
| 2007/0233364 A1 | 10/2007 | Kumar | |
| 2007/0262855 A1 | 11/2007 | Zuta et al. | |
| 2008/0021132 A1 | 1/2008 | Kim | |

(Continued)

FOREIGN PATENT DOCUMENTS

EP        1566665 A        8/2005

(Continued)

OTHER PUBLICATIONS

Chen et al., "Use of Operation Support Information Technology to Increase Ship Safety and Efficiency", Transactions, vol. 106, 1998, pp. 105-127.

(Continued)

*Primary Examiner*—Richard M. Camby
(74) *Attorney, Agent, or Firm*—Yee & Associates, P.C.; Wilson Royer

(57) ABSTRACT

A computer implemented method, apparatus, and computer usable program code for generating a route for a vessel to travel from a start point to an end point. A start point and an end point for the vessel are identified. A forecast of wave conditions during a period of time is obtained. A model of the vessel is obtained, wherein the model includes parameters used to calculate a response of the vessel to the wave conditions. A route is generated from the start point to the end point for the vessel to travel on using the model of the vessel and the forecast of the wave conditions, wherein the route avoids conditions that may cause a treacherous environment and meets a set of goals.

19 Claims, 13 Drawing Sheets

U.S. PATENT DOCUMENTS

| | | | |
|---|---|---|---|
| 2008/0125924 | A1 | 5/2008 | Daum et al. |
| 2008/0125958 | A1 | 5/2008 | Boss et al. |
| 2010/0168942 | A1 | 7/2010 | Noffsinger et al. |

FOREIGN PATENT DOCUMENTS

| | | |
|---|---|---|
| FR | 2760282 | 9/1998 |
| JP | 01187611 A | 7/1989 |
| JP | 10307042 A | 11/1998 |
| JP | 2007057499 A | 3/2007 |
| WO | 2004061737 | 7/2004 |
| WO | 2004097341 | 11/2004 |

OTHER PUBLICATIONS

Chen, "Weather Routing: a New Approach", Ocean Systems, Inc., pp. 11-15, retrieved Nov. 24, 2008 http://www.ocean-systems.com/papers.htm.

Teti et al., "Sun-Synchronous Lunar Polar Rover as a First Step to Return to the Moon", Proceedings ISAIRAS 2005 Conference, Munich, Germany, Sep. 2005, pp. 1-8 http://tim.barfoot.googlepages.com/teti_isairas05.pdf.

Avnet et al., "Lunar Telescope Facility Final Design Report", MIT Aeronautics and Astronautics, 2007, 7 pages of table of contents with full article at: http://ocw.mit.edu/NR/rdonlyres/Aeronautics-and-Astronautics/16-89JSpring-2007/EOOC807D-5D9C-47EC-A8AF-019708EFD1CA/0/report.pdf.

"Mars Autonomy Project Path Planning", 1999, pp. 1-3 http://www.frc.ri.cmu.edu/projects/mars/dstar.html.

Bradley et al., "Preliminary Cocnepts for a long-range Mars Rover Navigation System Prototype based on a Mars Global Terrain Database", Research Report No. 2001-695-18, Department of Computer Science, University of Calgary, Calgary Canada, pp. 1-9 architecture:http://dspace.ucalgary.ca/bitstream/1880/46267/2/2001-695-18.pdf.

Team MCNAV, "DARPA Lunar Grand Challenge 2005—MBARS", MCNAV System & Software Architecture (SSA), Carnegie Mellon University, Jul. 2005, pp. 1-11.

Thrun et al., "Stanley: The Robot that Won the DARPA Grand Challenge", Journal of Field Robotics 23(9) pp. 661-692, 2006.

U.S. Appl. No. 12/244,291, filed Oct. 2, 2008, Bruce et al.

U.S. Appl. No. 12/355,152, filed Jan. 16, 2009, Chen et al.

Dijkstra, "A Note on Two Problems in Connexion with Graphs", Numerische Mathematik 1, pp. 269-271, 1959.

PCT International Search Report for PCT/US09/67375 dated Aug. 4, 2010.

* cited by examiner

WHEN WAVE HEIGHT HW ≥ .04·L THEN:

SYNCHRONOUS AND PARAMETRIC ROLLING:
900 — PREVENT SYNCHRONOUS ROLLING: $T_E \neq T_R$
902 — PREVENT PARAMETRIC ROLLING: $T_E \neq T_R/2$ SURF-RIDING AND BROACHING-TO:
904 — CHANGE SHIP SPEED & COURSE: $V_S \cos(\chi) \neq$ WAVE PHASE VELOCITY SUCCESSIVE HIGH WAVE ATTACK:
906 — CHANGE SHIP SPEED & COURSE: $V_S \cos(\chi) \neq$ WAVE GROUP VELOCITY

*FIG. 9*

1000 — WHEN WAVE HEIGHT > 4% OF SHIP LENGTH

MINIMIZE: $\left[ \int \frac{1}{|\nu(t)|} \nu(t) dt \right]$

SUBJECT TO:
1002 — $V_S < V_S$ MAX
1004 — $.8 \not< T_E/T_R \not< 1.2$
1006 — $.4 \not< T_E/T_R \not< .6$
1008 — $.8 \not< V_S \cos(\chi)/V_P \not< 1.2$
1010 — $.8 \not< V_S \cos(\chi)/V_g \not< 1.2$

*FIG. 10*

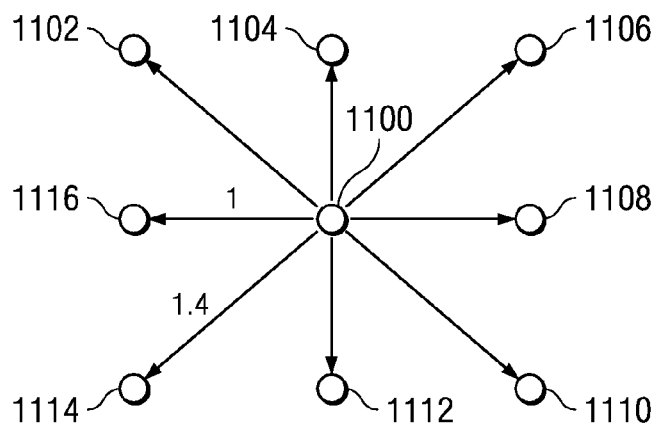

8 POSSIBLE HEADINGS

*FIG. 11*

METHOD AND APPARATUS FOR ROUTING OCEAN GOING VESSELS TO AVOID TREACHEROUS ENVIRONMENTS

BACKGROUND OF THE INVENTION

1. Field of the Invention

The present invention relates generally to an improved data processing system and in particular to a method and apparatus for generating routes for watercraft. Still more particularly, the present invention relates generally to a computer implemented method, apparatus, and computer usable program code for generating route plans for oceangoing vessels to avoid treacherous environments.

2. Description of the Related Art

Commercial vessels carry cargo, goods, passengers, and/or materials from one port to another. Commercial vessels may include, for example, tankers, bulk carriers, container vessels, and passengers. Globally, tens of thousands of vessels make crossings over the seas from one port to another port. A typical cargo vessel may make anywhere from ten to thirty crossings per year. Often, at any one time, one thousand to three thousand commercial vessels are at sea.

With these large numbers of commercial vessels, every year commercial vessels, such as large container vessels, bulk cargo vessels, and tanker vessels, encounter treacherously large seas. These encounters typically result in these types of vessels sustaining damage, loosing cargo, or in some cases the loss of the entire vessel. This type of phenomenon usually occurs during the winter months. One example is the north Pacific, where vessels follow a great circle route to and from Asia to the west coast of North America. Wave heights in excess of 100 feet have been reported. These sizes of waves are of a size that may damage or destroy even the largest vessels. Thus, thousands of commercial vessels are at potential risk for damage or loss.

With this situation, shipping companies are faced with a dilemma. In order to maximize profits, shipping companies need to minimize ocean crossing time. This minimization of the crossing time may include routes that place their vessels in a path of a dangerous storm or other treacherous conditions. The potential consequences of being caught in a treacherous environment on the ocean may result in excessive roll that may damage the vessel and the cargo.

A number of different types of dangerous conditions may occur on the seas to cause a treacherous environment. These conditions include several dangerous types of wave encounter conditions. The conditions include harmonic resonance, parametric roll motion, and slamming into heavy head seas. Currently, vessel operations employed to handle these types of situations are reactive in nature. For example, a vessel may respond to observing these types of conditions by reducing speed or changing course to avoid these situations.

Therefore, it would be advantageous to have an improved method, apparatus, and computer usable program code for routing vessels in a manner to avoid treacherous environments.

SUMMARY OF THE INVENTION

The illustrative embodiments provide a computer implemented method, apparatus, and computer usable program code for generating a route for a vessel to travel from a start point to an end point. A start point and an end point for the vessel are identified. A forecast of wave conditions during a period of time is obtained. A model of the vessel is obtained, wherein the model includes parameters used to calculate a response of the vessel to the wave conditions. A route is generated from the start point to the end point for the vessel to travel on using the model of the vessel and the forecast of the wave conditions, wherein the route avoids conditions that may cause a treacherous environment and meets a set of goals.

In another advantageous embodiment, a forecast of weather conditions is obtained. A set of parameters for the vessel is obtained, wherein the set of parameters is used to calculate a response of the vessel to the forecast of the weather conditions. A route is generated from a start point to an end point for the vessel using the model of the vessel and the forecast of the weather conditions, wherein the route avoids a treacherous environment when traveling from the start point to the end point.

In yet another advantageous embodiment, a computer program product contains a computer usable medium having computer usable program code for generating a route for a vessel. The computer program product includes computer usable program code to obtain a forecast of weather conditions. Computer usable program code is present to obtain a set of parameters for the vessel, wherein the set of parameters are used to calculate a response of the vessel to forecast the weather conditions. Computer usable program code is present to generate a route from a start point to an end point for the vessel using the set of parameters for the vessel and the forecast of the weather conditions, wherein the route avoids a treacherous environment when traveling from the start point to the end point.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is a diagram illustrating inequalities used in route optimization in accordance with an advantageous embodiment of the present invention;

FIG. 10 is an illustration of conditions used to avoid treacherous environments in accordance with an advantageous embodiment of the present invention;

FIG. 11 is a diagram illustrating headings that may be selected using a routing process for vessels in accordance with an advantageous embodiment of the present invention;

DETAILED DESCRIPTION OF THE PREFERRED EMBODIMENT

Figure 1:
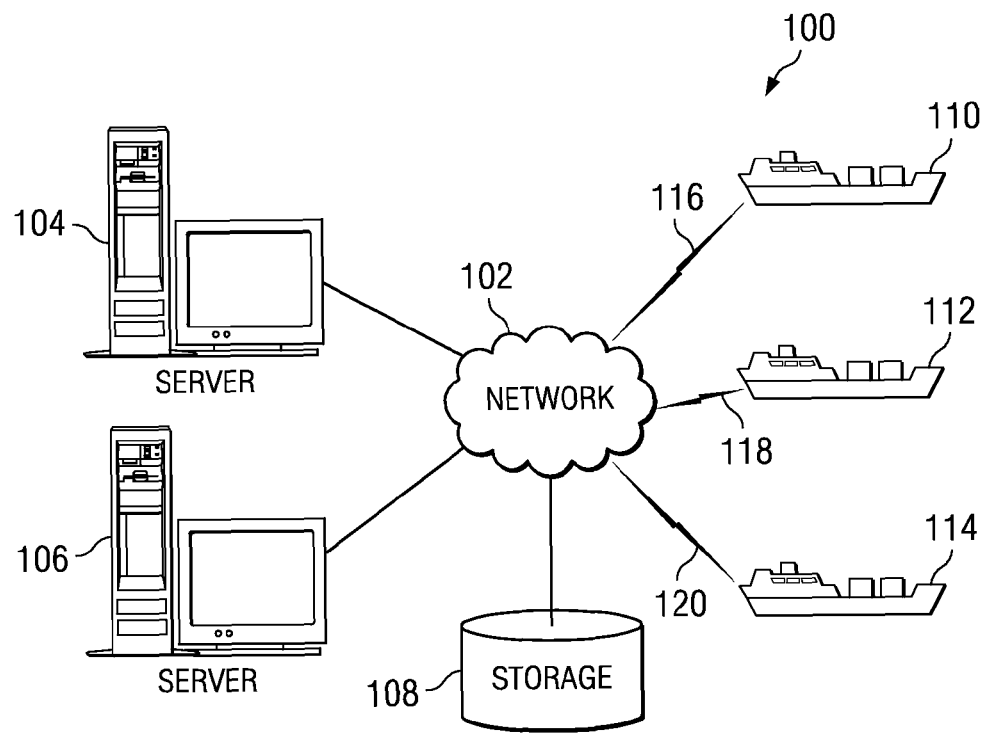
FIG. 1 is an exemplary diagram of a system is provided in which advantageous embodiments of the present invention may be implemented.

With reference now to the Figures and in particular with reference to FIG. 1, an exemplary diagram of an environment is provided in which advantageous embodiments may be implemented. It should be appreciated that FIG. 1 is only exemplary and not intended to assert or imply any limitation with regard to the environment in which different embodiments may be implemented. Many modifications to the depicted environments may be made.

FIG. 1 depicts a pictorial representation of a network of data processing systems in which advantageous embodiments may be implemented. Network data processing system 100 is a network of computers in which the advantageous embodiments may be implemented. Network data processing system contains network 102. This network is the medium used to provide communications links between various devices and computers connected together within network data processing system 100. Network 102 may include connections, such as wired, wireless communications links, or fiber optic cables.

In the depicted examples, server 104 and server 106 are connected to network 102 along with storage unit 108. In addition, clients 110, 112, and 114 connect to network 102. In these illustrative examples, clients 110, 112, and 114 connect to network 102 through wireless communications links 116, 118, and 120. These wireless communication links may be through radio frequency signals. Additionally, the wireless communication links may established through satellites within network 102. Clients 110, 112, and 114 in these examples are data processing systems located on vessels. In these advantageous embodiments, vessels are watercraft, such as, for example, tankers, bulk carriers, container vessels, and passenger vessels.

Storage unit 108 also connects to network 102 and provide data and other information. For example, storage unit 108 may contain databases.

In the depicted examples, servers 104 and 106 provide data in programs to clients 110, 112, and 114. Network data processing system may include additional servers, clients, and other devices not shown.

In this illustrative example, network data processing system 100 may include different types of networks, such as an Internet, a local area network (LAN), and a wide area network (WAN). In particular, network 102 may include the internet or a satellite communications network. FIG. 1 is intended as an example, and not as an architectural limitation for the different advantageous embodiment.

Figure 2:
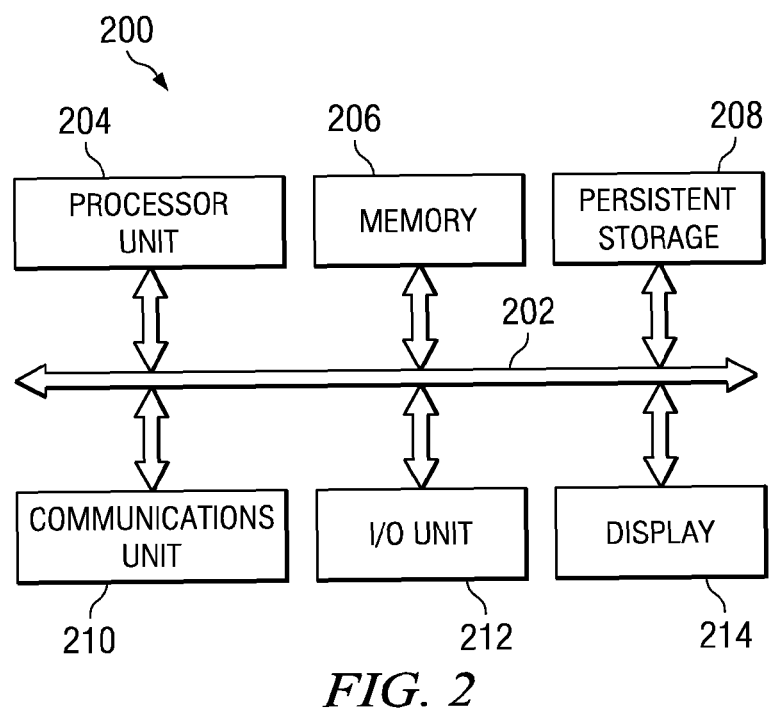
FIG. 2 is a diagram of a data processing system in accordance with an illustrative embodiment of the present invention.

Turning now to FIG. 2, a diagram of a data processing system is depicted in accordance with an illustrative embodiment of the present invention. Data processing system 200 is an example of a data processing system that may be used to implement a server or client, such as server 104 or client 110 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 206 may be implemented using one or more heterogeneous processor systems in which a main processor is present with secondary processors on a single chip. Memory 206, in these examples, may be, for example, a random access memory. Persistent storage 208 may take various forms depending on the particular implementation. For example, persistent storage 208 may be, for example, a hard drive, a flash memory, a rewritable optical disk, a rewritable magnetic tape, or some combination of the above.

Communications unit 210, in these examples, provides for communications with other data processing systems or devices. In these examples, communications unit 210 is a network interface card. I/O unit 212 allows for input and output of data with other devices that may be connected to data processing system 200. For example, I/O unit 212 may provide a connection for user input though a keyboard and mouse. Further, I/O unit 212 may send output to a printer. Display 214 provides a mechanism to display information to a user.

Instructions for the operating system and applications or programs are located on persistent storage 208. These instructions and may be loaded into memory 206 for execution by processor unit 204. The processes of the different embodiments may be performed by processor unit 204 using computer implemented instructions, which may be located in a memory, such as memory 206.

The advantageous embodiments of the present invention provide a computer implemented method, apparatus, and computer usable program code for generating a route for a vessel to travel from a start point to an end point. A start point and an end point are identified for the vessel. The start point may be a port or even the current location of the vessel. Typically, the end point is a port for the vessel. A forecast of wave conditions during the period of time during which the vessel is to travel from the start point to the end point is obtained. A model of the vessel also is obtained. In these examples, this model includes a set of parameters used to calculate a response of the vessel to wave conditions in the forecast. In these illustrative examples, the optimum route is a route that is capable of being completed by a vessel from the origin to the destination in the minimum time, subject to the safety constraints needed to avoid treacherous conditions based on weather forecasts. This set of parameters is a set of one or more parameters. The parameters used depends on the particular implementation.

A route is generated from the start point to the end point for the vessel to travel on using the model of the vessel and the forecast of the weather conditions. In these examples, the weather forecasts are those for waves in the different areas that are traversed by the selected route. This route avoids conditions that may result in a treacherous environment and meets a set of goals. This set of goals is a set of one or more goals.

Typically, a single goal is present in which the goal is to travel from the start point to the end point with the lowest cost. Other goals may include having the fastest travel time or the lowest fuel consumption. The particular goals in the set of goals depends on the implementation.

Figure 3:
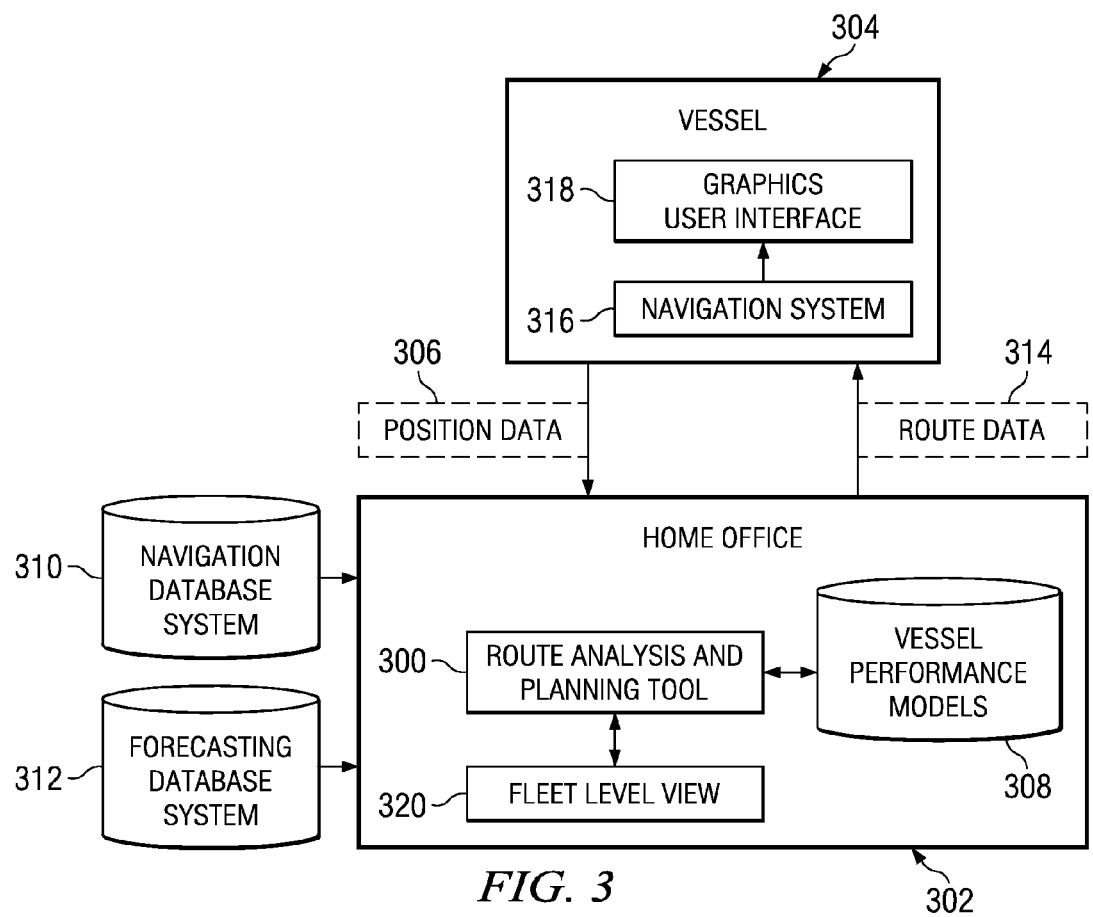
FIG. 3 is a diagram illustrating components for generating routing information used to avoid treacherous environments in accordance with an advantageous embodiment of the present invention.

With reference now to FIG. 3, a diagram illustrating components for generating routing information used to avoid treacherous environments is depicted in accordance with an advantageous embodiment of the present invention. In these illustrative examples, route analysis and planning tool 300 is an example of a program or application containing a routing process and is located at home office 302. Route analysis and planning tool 300 is a program or application designed to plan routes for vessels to optimize time to desired destinations under constraining conditions, which may include waves and winds.

In these examples, the route is optimized to reach a destination with an optimal travel time. Of course, other embodiments may include other goals, such as reducing the cost to travel from a start point to an end point. Further, another goal for optimization that may be realized by the route is to reduce fuel cost. Of course, other goals alone or in combination of these and others may be taken into account by route analysis and planning tool 300. In these examples, the optimization of a route to meet a goal, such as travel time, indicates that travel time may be reduced, but not necessarily resulting in the fastest travel time.

In these illustrative examples, route analysis and planning tool 300 is located at home office 302. Home office 302, in these examples, is a location at which management of a fleet of vessels may occur. Although these examples illustrate performing routing using route analysis and planning tool 300 at home office 302, the routing process and tools may be located in other places. For example, route analysis and planning tool 300 may be located on board vessel 304. In an embodiment when route analysis and planning tool 300 is located on vessel 304, this tool may be used to provide routes just for vessel 304. Alternatively, vessel 304 may serve as a location to provide routing for other vessels.

In these examples, vessel 304 is an example of a vessel managed by home office 302. Vessel 304 transmits position data 306 to route analysis and planning tool 300. Position data includes a location of vessel 304. This data may be obtained through a global positioning system on vessel 304. The position information also may include a velocity or speed of vessel 304. This information is used by route analysis and planning tool 300 to identify the location of vessel 304 in determining whether changes in the route of vessel 304 may be suggested.

Route analysis and planning tool 300 uses vessel performance models 308 in determining whether various conditions that are present and forecasted may affect vessel 304 in its route to a destination. The same condition at sea affects different types of vessels in different ways. As a result, in planning the route for vessel 304, the performance model for this vessel is retrieved from vessel performance models 308 to determine whether different conditions, that may result in a treacherous environment, require changes in routing. Route analysis and planning tool 300 also uses navigation information from navigation database system 310 and forecasting information from forecasting database system 312.

The navigation information includes various types of information, such as, for example, tides and currents for different locations on the seas, the location of traffic lanes, the location of ports, the location of lights and buoys, and the location of obstructions in shallow water. These types of data are examples of data that may be located in navigation database system 310, but are not an exhaustive list of examples.

Forecasting information may include, for example, current and predicted weather, winds, and wave data. This list of examples of forecasting data available in forecasting database system 312 also is an exemplary list. Navigation database system 310 and forecasting database system 312 may be found at a single location or may be distributed through different locations depending on the particular implementation.

Route analysis and planning tool 300 uses this information along with the performance model for vessel 304 to plan a route from the current location of vessel 304 to its destination. This routing analysis is performed in response to events that occur in the advantageous embodiments. These events may be periodic events, such as performing analysis every hour or every five hours to determine whether changes in routing may be suggested.

Alternatively, the routing analysis may be performed in response to an event, such as a request from vessel 304 or a change in current or predicted weather conditions. Route analysis and planning tool 300 generates a route for vessel 304 based on the navigation information, forecasting information, and the vessel performance model. This route is sent as route data 314 to vessel 304.

When received, route data 314 is processed by navigation system 316. Navigation system 316 is an example of software that may be executed on a data processing system, such as data processing system 200 in FIG. 2 on vessel 304. Navigation system 316 presents the proposed or suggested route on graphical user interface 318. In response, a captain or other operator on vessel 304 may determinate whether to use the suggested route. Graphical user interface 318 may be used to change the route of vessel 304 in these examples.

Route analysis and planning tool 300 may change a typical route that is the shortest or usual route taken that takes vessel 304 into the waters having significant waves and head winds, which may damage the vessel or cargo that the vessel is carrying. Route analysis and planning tool 300 will generate a new route, or reroute the vessel minimizing the time and cost of the voyage. The rerouting may be near real time, depending on how fast data in forecasting database system 312 is updated.

In addition, the route generated by route analysis and planning tool 300 may be displayed on fleet level view 320, which is a graphical user interface that provides a display of the routes for different vessels in the fleet managed by home office 302.

With route analysis and planning tool 300, safe and efficient routes may be generated that avoid treacherous conditions, while optimizing travel time. This new or modified route may also optimize other factors other than travel time. In some cases, for example, decreasing travel time may increase costs due to fuel consumption factors for various vessels. As a result, some of the routes generated by route analysis and planning tool 300 may actually be slower than the fastest possible time to a destination, but reduces the cost for transporting the cargo based on fuel costs. Of course, other factors and goals may be taken into account in addition to, or in place of the depicted ones.

With these types of considerations, the goal for route analysis and planning tool 300 is a lowest cost to travel from a start point to an end point. Route analysis and planning tool 300 may be executed on a data processing system, such as data processing system 200 in FIG. 2 in home office 302.

Figure 4:
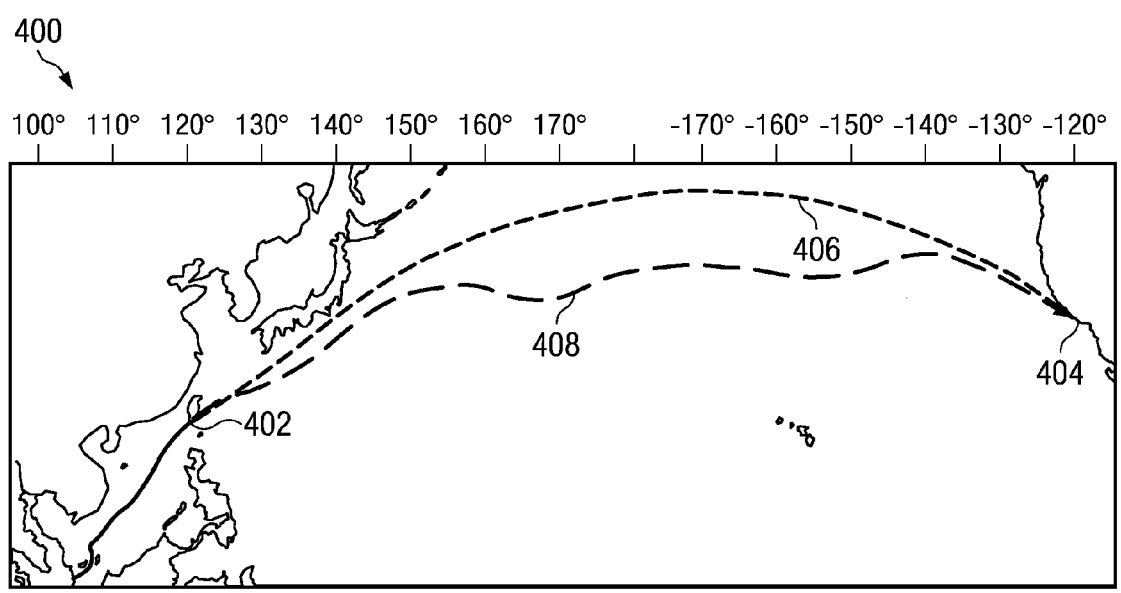
FIG. 4 is a diagram illustrating a display of a route generated by route analysis and planning tool in accordance with an advantageous embodiment of the present invention.

Turning now to FIG. 4, a diagram illustrating a display of a route generated by route analysis and planning tool is depicted in accordance with an advantageous embodiment of the present invention. In this example, display 400 is an example of routes that may be presented in graphical user interface 318 in vessel 304 or fleet level view 320 in home office 302 in FIG. 3.

In this illustrative example, display 400 includes a route from start point 402 to end point 404. As depicted, start point 402 is a current location of the vessel when the routing analysis is performed. Depending on the implementation, start point 402 may be a port at which the vessel begins its travel to end point 404.

Route 406 illustrates a typical route selected by an operator of a vessel, which may require reduction of speed in response to different treacherous conditions. Route 408 is an optimized route to destination 404. In this example, route 408 has a longer distance to destination 404, but may be traveled in a shorter amount of time because reductions in speeds are not necessary by avoiding treacherous environments that may be present.

As a result, route 408 provides a reduction in overall transit time to destination 404 from point 402 as compared to route 406. Based on this information, the operator of a vessel may continue on route 406 or may chose to change to route 408.

Figure 5:
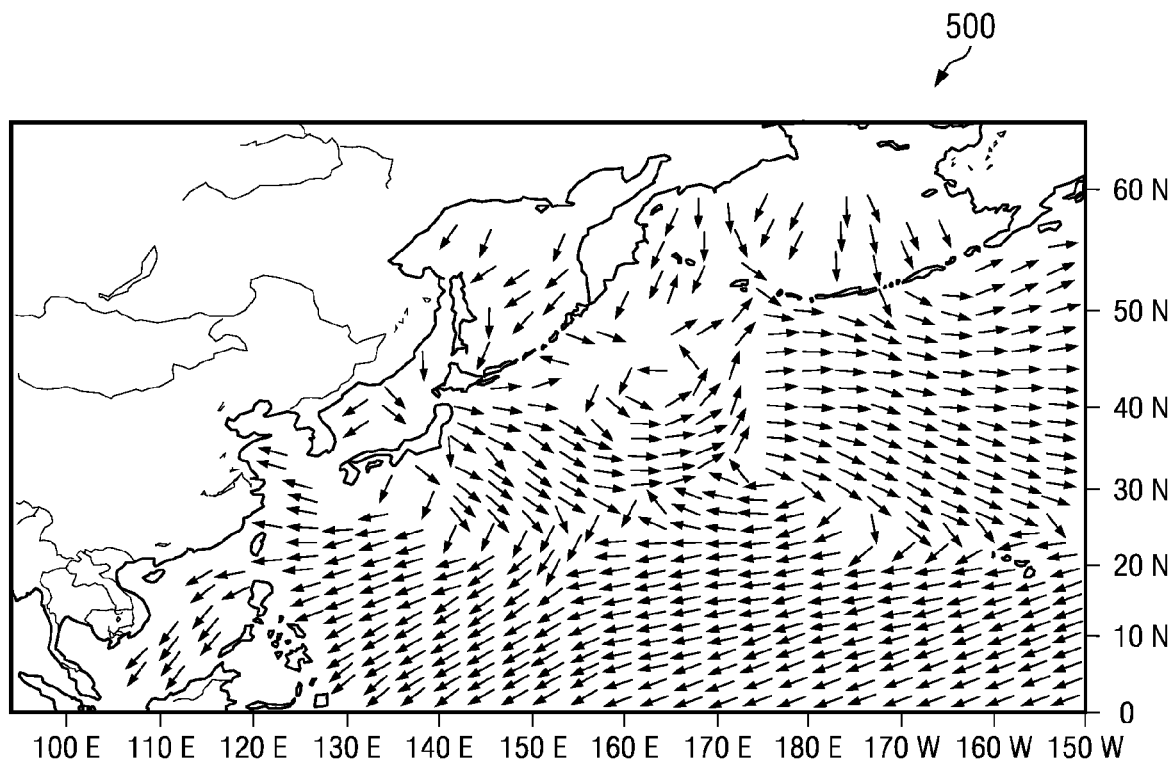
FIG. 5 is a diagram illustrating weather data that may be used to analyze a route for a vessel in accordance with an advantageous embodiment of the present invention.

Turning next to FIG. 5, a diagram illustrating weather data that may be used to analyze a route for a vessel is depicted in accordance with an advantageous embodiment of the present invention. In this example, diagram 500 provides wave height, direction, and location for a geographic area. This information is a forecast of wave conditions that may be used by a routing process, such as route analysis and planning tool 300 in FIG. 3. Diagram 500 illustrates a presentation of the data predicting or forecasting wave conditions for a particular area.

With this information, a routing process may determine whether conditions warrant changes in a route through these locations based on a performance model for that vessel. In the illustrative examples, a Dijkstra's algorithm is implemented in route analysis and planning tool 300 in FIG. 3. The Dijkstra's algorithm is used in route analysis and planning tool 300 in FIG. 3 to consider the nearest neighbors to the current location of the vessel to determine whether changes in routing should be suggested to avoid dangerous or treacherous environments. In these illustrative embodiments, treacherous environments may be identified using forecasts of waves, starting or current location for the vessel, a destination for the vessel, and information about the vessel. The information about the vessel includes any information needed to identify whether a wave condition may result in a treacherous environment for the vessel. This information may include, for example, the natural roll period for the vessel and the speed of the vessel.

Mathematical relationship between wave period, wave phase velocity, wave group velocity, wave height, wave direction, and vessels speed and heading are used to generate a wave encounter.

Figure 6:
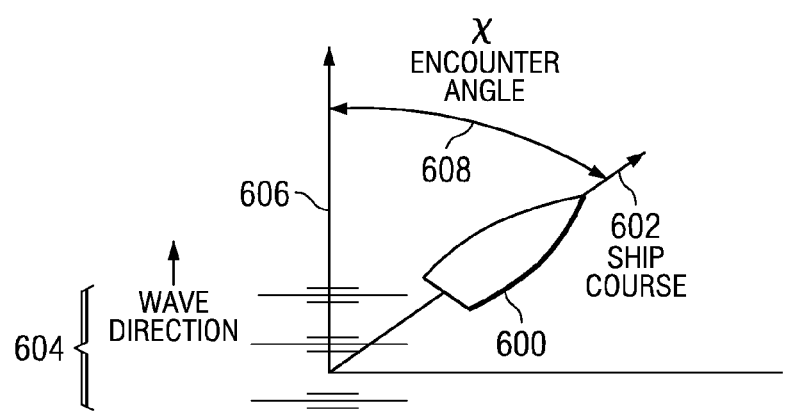
FIG. 6 is a diagram illustrating wave encounter conditions for a vessel in accordance with an advantageous embodiment of the present invention.

Turning now to FIG. 6, a diagram illustrating wave encounter conditions for a vessel is depicted in accordance with an advantageous embodiment of the present invention. In this example, vessel 600 travels the direction of arrow 602. Waves 604 travel in the direction of vector 606. Angle 608 is an encounter angle ($\chi$) between the direction of waves 604 along vector 606 and the course of vessel 600 along vector 602.

The different illustrative embodiments provide a route analysis and planning tool that may be used to change the vessel course along vector 602 to reduce wave encounter conditions with waves 604 that may cause damage to vessel 600 or to cargo being carried by vessel 600. These type of wave counter conditions may result in a treacherous environment for vessel 600 with vessel 600 and/or the cargo being carried by vessel 600 being damaged.

The different wave encounter conditions that may cause damage include synchronous rolling, parametric rolling, surf-riding and broaching-to, and successive high wave attack. Synchronous rolling may occur when the wave encounter is about equal to the ship's natural roll. Parametric rolling may occur when the wave encounter is about one-half of the ship's natural roll. Surf-riding broaching-to occurs when the vessel speed times the cosine of the encounter angle is about equal to the wave phase velocity. A successive high wave attack may occur when the vessel speed times cosine of the encounter angle is about equal to the wave group velocity.

Currently, without the routing process provided by the advantageous embodiments of the present invention, an operator of the vessel can only respond to encountering these conditions. The response may be to reduce speeds or to change course in order to come out of the dangerous zone that has been encountered. Using the routing process in the advantageous embodiments, these types of conditions may be predicted for the current route and the current route may be altered to avoid these conditions without requiring the operator of the vessel to react. By predicting treacherous environments for a vessel and selecting a route to avoid those conditions in a treacherous environment, the different illustrative embodiments provide an ability to reach destinations with less travel time than currently used systems.

Figures 7, 8:
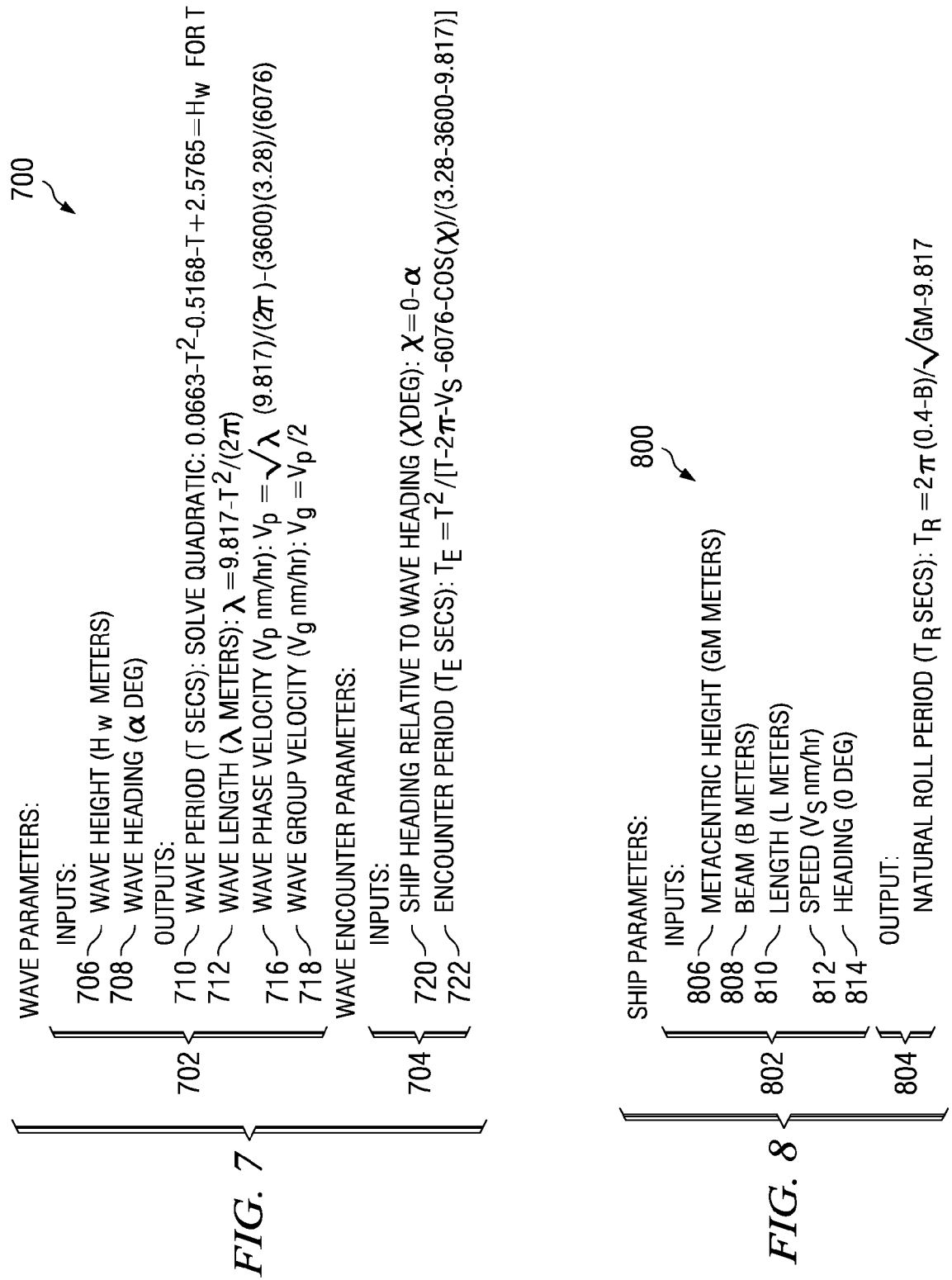
FIG. 7 is a diagram illustrating wave parameters in accordance with an advantageous embodiment of the present invention.
FIG. 8 is a diagram illustrating vessel parameters in accordance with an advantageous embodiment of the present invention.

The different parameters illustrated in FIGS. 7 and 8 are used by a routing process to determine when a treacherous environment may occur with respect to a particular type of vessel, based on the parameters for that vessel.

With reference now to FIG. 7, a diagram illustrating wave parameters is depicted in accordance with an advantageous embodiment of the present invention. Wave parameters 700 may be used by route analysis and planning tool 300 in FIG. 3 to identify conditions that may result in a treacherous environment for a vessel. In this example, parameters 700 include wave parameters 702 and wave encounter parameters 704. Wave height 706 and wave heading 708 are inputs in wave parameters 702. Wave period 710, wave length 712, wave phase velocity 716 and wave group velocity 718 are outputs. Vessel heading relative to wave heading 720 and encounter period 722 are inputs for wave encounter parameters 704. With respect to the different parameters in FIG. 7, the different inputs are received from weather forecast and ship measurements in these examples. The outputs illustrated in FIG. 7 are derived from the different inputs and are used to test for safe conditions. Some of these outputs are from the model of the vessel.

Turning now to FIG. 8, a diagram illustrating vessel parameters is depicted in accordance with an advantageous embodiment of the present invention. In this illustrative example, vessel parameters 800 include inputs 802 and natural roll period 804. Inputs 802 include metacentric height 806, beam 808, length 810, speed 812, and heading 814.

Metacentric height 806 is a characteristic of a vessel, which helps to determine the stability of the vessel in water. Metacentric height 806 is a well known parameter for a vessel. This parameter has a direct relationship with the rolling period for a vessel. A vessel with a small value for metacentric height 806 has a long roll period, which increases the risk of capsizing in rough weather or other treacherous conditions.

Beam 808 represents the width of a vessel at its widest point where a point along side of the vessel at the mid-point of the length for the vessel. Length 810 represents the length of the vessel and speed 812 represents the velocity at which the vessel is traveling. Heading 814 is measured in degrees.

Natural roll period 804 is the output in these examples. Natural roll period 804 is the period of roll oscillations of a vessel in calm water. These roll oscillations are a roll motion caused by an impulsive disturbance in the roll velocity, such as that caused by wind gusts.

Turning now to FIG. 9, a diagram illustrating inequalities used in route optimization is depicted in accordance with an advantageous embodiment of the present invention. In these examples, inequalities 900, 902, 904, and 906 are used to provide a set of operating constraints to determine the maximum speed that a vessel is able to travel along a given heading in a safe manner that avoids damage to the vessel or cargo for the vessel.

In these examples, the inequalities are used when the wave height is greater than four percent of the vessel length. Of course, a different percentage or other threshold may be used depending on the particular implementation. For example, the inequalities may be applied when the wave height is two percent of the vessel length rather than four percent.

Inequality 900 is used to prevent or avoid synchronous rolling while inequality 902 is used to prevent or avoid parametric rolling. Inequality 904 is used to avoid surf-riding and broaching-to. Inequality 906 is employed to avoid successive high wave attacks.

In this example, $H_w$ is the wave height in meters. $\chi$ is the wave encounter angle in degrees. $V_s$ is the vessel speed in knots. L is the vessel length and $T_E$ is the encounter wave period in seconds while $T_R$ is the natural roll period of the vessel in seconds. In identifying an optimal route, the routing process in the different illustrative embodiments is used to minimize the transit time from the origin or current point to the destination.

Safety margins may be built-in above and below the selected safety and inequality conditions illustrated in FIG. 9. One example of the safety margin is twenty percent above and below the inequality conditions illustrated in FIG. 9. Of course, other margins may be used depending on the particular implementation.

With reference now to FIG. 10, an illustration of conditions used to avoid treacherous environments is depicted in accordance with an advantageous embodiment of the present invention.

In these examples, the depicted conditions are used when condition 1000 is present. Condition 1000 specifies that conditions 1002, 1004, 1006, 1008, and 1010 are used when the wave height is greater than four percent of the vessel length. In these examples, the travel time from a current or starting point to a destination is minimized subject to conditions 1002, 1004, 1006, 1008, and 1010.

For the conditions in these examples, $T_E$ is the wave encounter period in seconds, $T_R$ is the natural roll period of the vessel in seconds, $V_S$ is the vessel speed in nautical miles per hour, $\theta$ is the vessel heading in degrees, $\upsilon(t)$ is the vessel velocity vector, $V_P$ is the wave phase velocity in nautical miles per hour, $V_g$ is the wave group velocity in nautical hours per hour, $\alpha$ is the wave direction in degrees, and $\chi$ is equal to $\theta-\alpha$, which is the relative vessel heading in degrees. These conditions are used as conditions to minimize the travel time as identified in condition 1010.

By slowing down a vessel, a frequency that a vessel encounters waves changes. The speed of a vessel may be slowed until the wave encounter meets conditions 1004 and 1006. Changing the speed of a vessel also directly affects conditions 1008 and 1010. The resulting speed of a vessel altered to meet these conditions is integral to travel time, if the particular area or portion of the ocean or other body of water is to be crossed at this particular heading at this particular point in time.

Turning now to FIG. 11, a diagram illustrating headings that may be selected using a routing process for vessels is depicted in accordance with an advantageous embodiment of the present invention. In this example, grid point 1100 is the current location of the vessel. Grid points 1102, 1104, 1106, 1108, 1110, 1112, 1114, and 1116 are neighboring grid points to grid point 1100. In these examples, a grid point is the center of a grid square. Routing of a vessel may be through different grid squares in these examples. These grid points represent possible headings for the vessel from grid point 1100. In the advantageous embodiments, the routing process employs a Dijkstra's algorithm to identify the appropriate point, taking into account wave conditions and constraints to avoid treacherous environments for the vessel.

Figure 12:
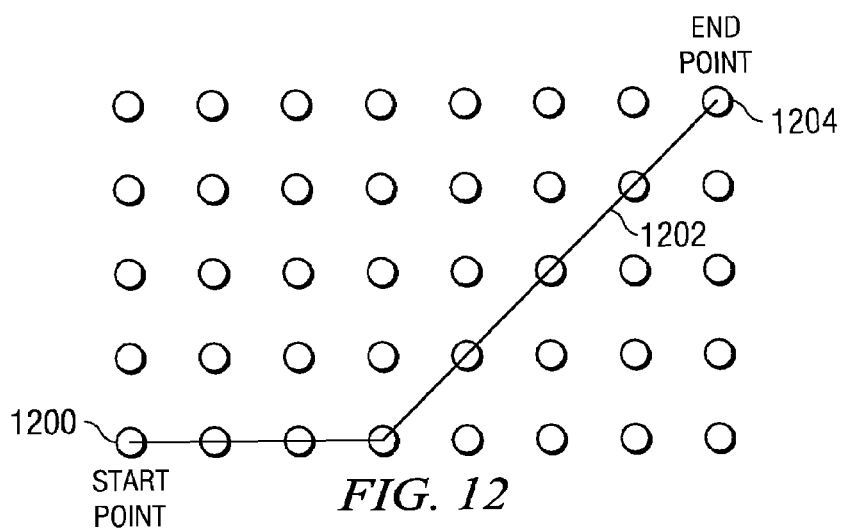
FIG. 12 is an illustration of a route from a start point to an end point for a vessel using a routing process in accordance with an advantageous embodiment of the present invention.

Turning now to FIG. 12, an illustration of a route from a start point to an end point for a vessel using a routing process is depicted in accordance with an advantageous embodiment of the present invention. In this example, the vessel begins at start point 1200 and follows route 1202 to end point 1204. Route 1202 is generated using a Dijkstra's algorithm within the process that takes into account forecasts of wave conditions in the various points along route 1202.

The example in FIG. 12 is a simple example of an implementation of a routing process to identify an optimum route. In many cases, the optimal route or path for a vessel to sail between two points is a great circle path because the vessel travels on a globe rather than a "flat surface". In traveling from one point to another point, a great circle is a circle on the surface of the sphere having the same circumference of the sphere. A great circle is an analog of a "straight line" in spherical geometry. A great circle path on a spherical surface is a path with the smallest curvature and is an arc having the shortest path between two points on the surface. The different embodiments recognize that identifying a route or path for a vessel may be made easier as the number of possible headings from a point increases.

Although these types of heading may be employed using the different conditions described above, routing to meet the conditions may be made more difficult. Further, by using eight headings, an ability to produce great circle routes also is made more difficult. Thus, the different illustrative embodiments also include an additional feature in addition to using the different conditions for avoiding treacherous environments. The different illustrative embodiments provide an ability to use additional headings in generating routes.

Figure 13:
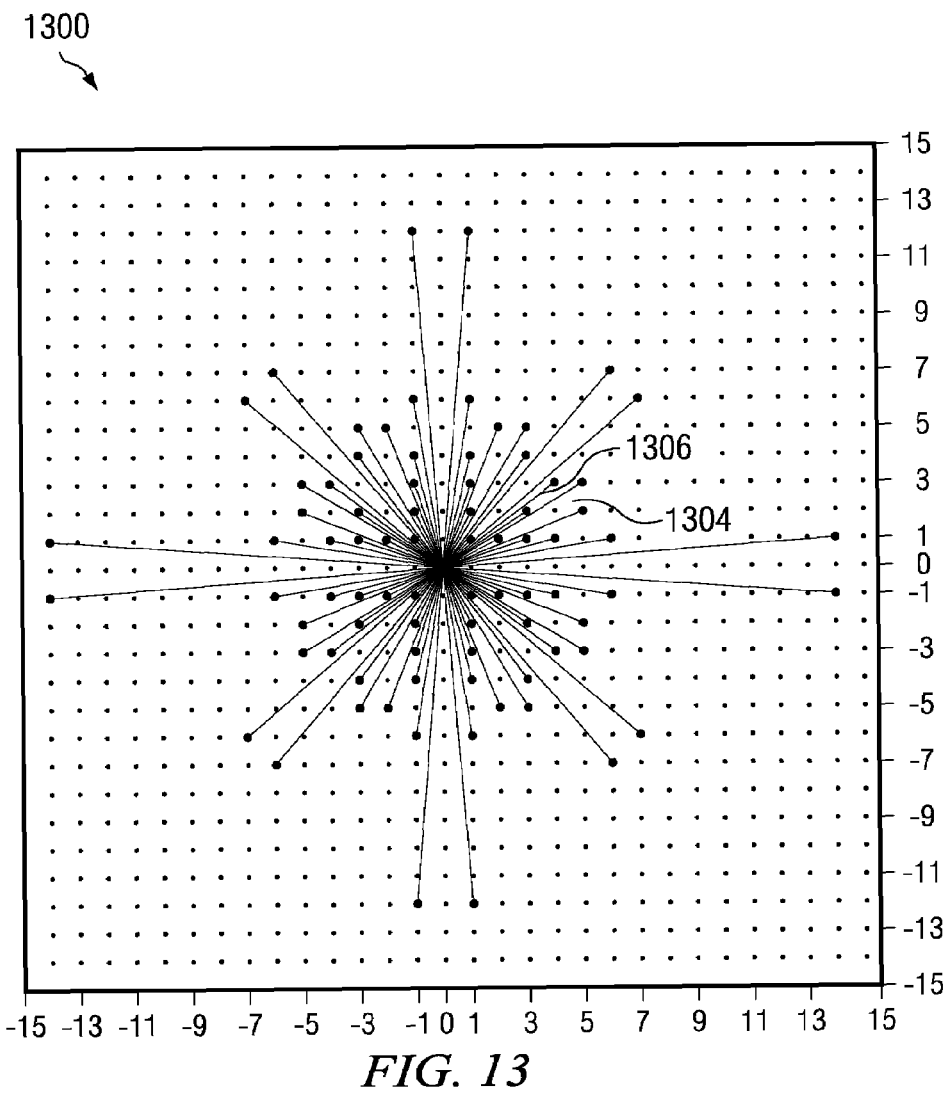
FIG. 13 is a diagram illustrating minimum angular resolution for use in a routing process in accordance with an advantageous embodiment of the present invention.

With reference now to FIG. 13, a diagram illustrating minimum angular resolution for use in a routing process is depicted in accordance with an advantageous embodiment of the present invention. In this example, graph 1300 illustrates a five degree minimum angular resolution in which more than eight adjacent nodes may be considered for the next possible heading of a vessel at point 1302.

As can be seen, in addition to the eight adjacent grid points, additional grid points farther out from point 1302 also may be considered. This system allows the routing process to consider all the nearest neighbor grid points within a maximum radius such that the minimum angular separation between any two grid points is no greater than five degrees in this example. The illustration in FIG. 13 is a simplified illustration. The selection of neighbor grid points involves more then using all grid points within a given radius in the illustrative examples. Processing all neighbor grid points within a radius results in additional calculations that are not necessary. The different illustrative embodiments may reduce the number of calculations by selecting neighbor grid points in a manner that the number of grid points in the set is minimized. Further, the selection of the neighbor grid points from point 1302 is minimized, subject to the difference between adjacent headings falling below a given maximum.

In these examples, for headings next to the axis or next to 45 degrees off an axis, a neighbor grid point is far away relative to other grid points. In these examples, these types of neighbor grid points are 12 grid squares away. The set of neighbor grid points do not include all the grid points within the radius of 12 of point 1302 in these examples. Most of the grid points within the radius are not included in this set to reduce the number of calculations made. Headings on the axis or 45 degrees off of an axis only update the nearest neighbor grid point. Updating other neighbor grid points along the line is considered redundant in these examples. As a result, those grid points are not included in the illustrative embodiments.

In selecting a neighbor point, such as point 1304, a vessel will travel from point 1302 to point 1304 through path 1306. This path takes the vessel through a number of different grid points. A pattern of neighbor points are produced around a permanently labeled grid point. The routing process updates the label for each of these neighbor points that are traversed by path 1306.

Figure 14:
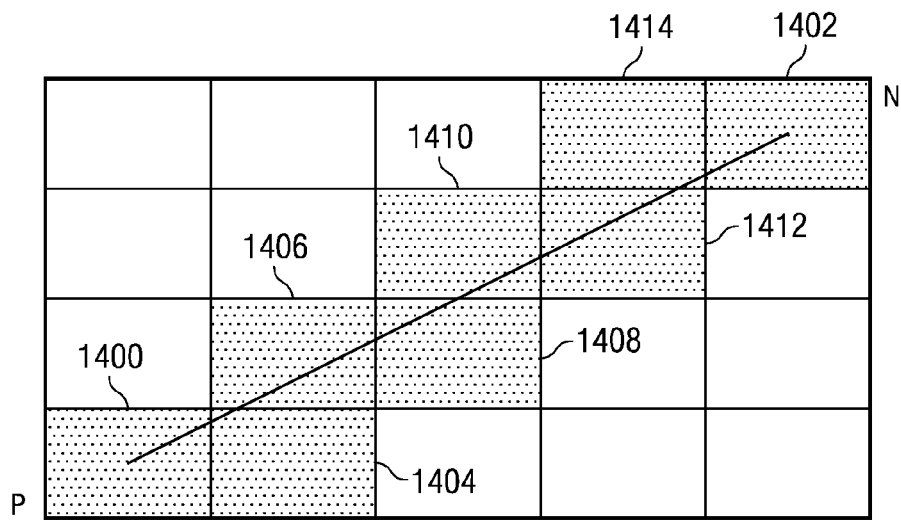
FIG. 14 is a diagram illustrating a path from the current node of the vessel to a destination node in accordance with an advantageous embodiment of the present invention.

Turning now to FIG. 14, a diagram illustrating a path from the current location of the vessel to a destination location is depicted in accordance with an advantageous embodiment of the present invention. In this example, path 1306 from FIG. 13 crosses a sequence of grid squares in which the centers of different points are present. For example, point 1302 from FIG. 13 is the center of the grid square 1400 while point 1304 from FIG. 13 is the center of grid square 1402. Path 1306 also travels through grid squares 1404, 1406, 1408, 1410, 1412 and 1414 to reach grid square 1402.

Figure 15:
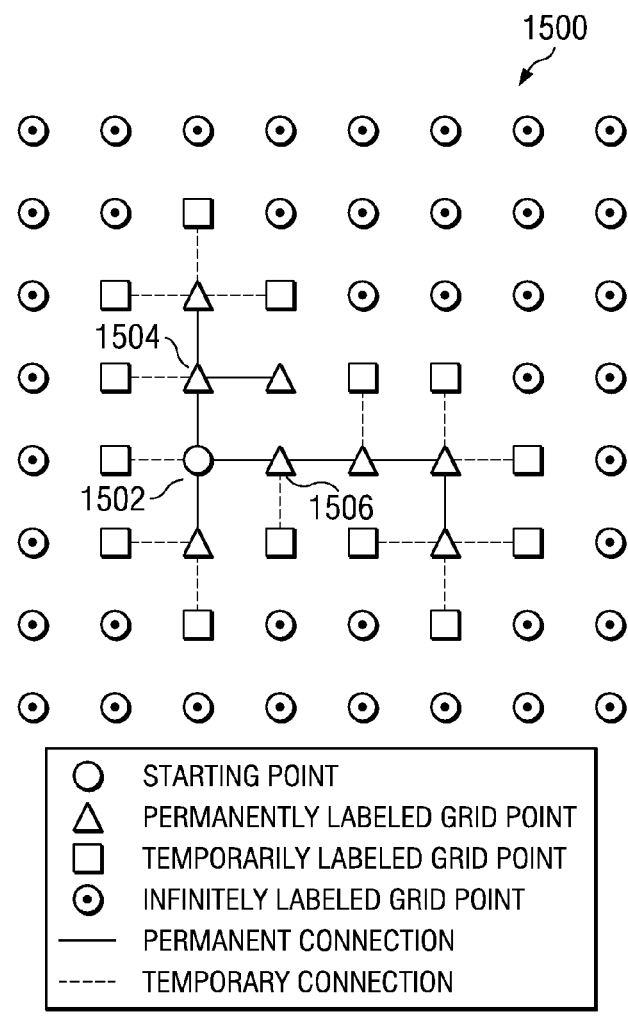
FIG. 15 is a diagram illustrating a grid network generated by the routing process in accordance with an advantageous embodiment of the present invention.

Turning now to FIG. 15, a diagram illustrating a grid network generated by a routing process is depicted in accordance with an advantageous embodiment of the present invention. In this example, grid 1500 contains points in a network created through the use of a Dijkstra's algorithm used to find the best route between two points. In these examples, the best route is the route that has the minimum cost to traverse from the starting point to the destination. In the illustrative embodiments, a Dijkstra's algorithm is employed to label each point within grid 1500 with a total cost of the currently known best route to the destination point from the starting point.

In processing grid 1500, the grid is initialized so that all points have a label of infinity as an initial label. The different points in grid 1500 is analogous to or represent points, such as those found in FIGS. 12 and 13.

A starting point is identified and given a permanent label of zero. In this example, the starting point is starting point 1502. For each non-permanently labeled neighbor grid point of starting point 1502, that neighbor grid point is processed to determine the total cost of reaching that neighbor grid point from starting point 1502. This total cost is the current label value of the current grid point plus the cost of traversing from the current grid point to the neighbor grid point. If the total cost is less than the current label set for the neighbor grid point, the current label is set to new total cost and a connection is generated to point P, which is the current grid point. For example, grid point 1504 and grid point 1506 are connected to starting point 1502.

After this identification has been made for all the neighbor grid points to starting point 1502, the non-permanently labeled grid point with the smallest label is identified. The label on this point is made permanent. This grid point is now the new or current starting point and processing begins again for all of the neighbor points to this new staring point. For example, if grid point 1506 is identified as the end point, this grid point is now identified as the staring point and the process begins again for all the points surrounding point 1506.

Figure 16:
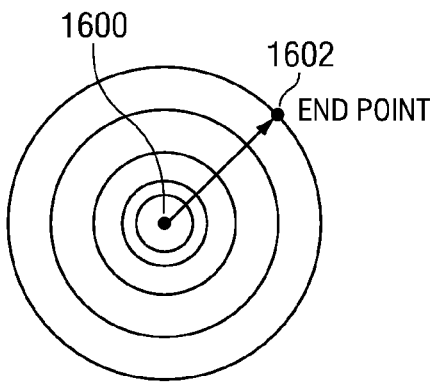
FIG. 16 is a diagram illustrating the use of a Dijkstra's algorithm in a routing process in accordance with an advantageous embodiment of the present invention.

Turning now to FIG. 16, a diagram illustrating the use of a Dijkstra's algorithm in a routing process is depicted in accordance with an advantageous embodiment of the present invention. In one embodiment, a flat objective function space is employed to identify the cost to travel from start point 1600 to end point 1602. In this implementation, the routing process using the Dijkstra's algorithm searches over an ever increasing circle until end point 1602 is found. End point 1602 is the point having the lowest cost in these examples.

Figure 17:
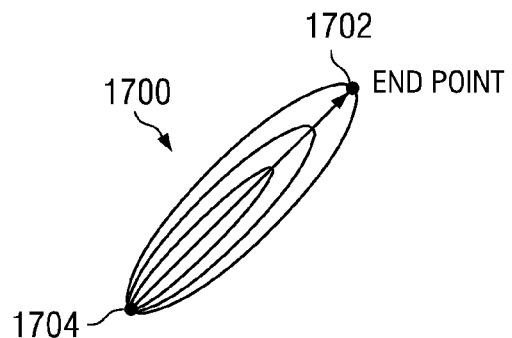
FIG. 17 is a diagram illustrating identifying an end point using a routing process in accordance with an advantageous embodiment of the present invention.

Turning now to FIG. 17, a diagram illustrating identifying an end point using a routing process is depicted in accordance with an advantageous embodiment of the present invention. In this example, graph 1700 illustrates a search made using a modification to a Dijkstra's algorithm in a routing process is shown. In this example, the use of the Dijkstra's algorithm identifies end point 1702 as having the lowest cost to traverse from start point 1704.

This type of search is made by setting the total cost equal to $L(P)+C(P,N)+E(N,End)$. $L(P)$ is the label value for the grid point, $C(P,N)$ is the cost of traveling from the permanent grid point to the neighbor grid point. $E(N,End)$ is an estimate of the total costs to travel from the neighbor point to the actual end point. In these examples, the estimate is typically an under estimate to ensure that an optimal route is created.

In this particular example, the use of the modified Dijkstra's algorithm searches over an ever increasing ellipse until end point 1702 is found. This ellipse has a long skinny shape as compared to the circle or search performed in FIG. 16. As a result, a smaller area is searched reducing the amount of processing time needed. Either approach in FIG. 15 and FIG. 16 may be used depending on the particular implementation and performance needs.

Figure 18:
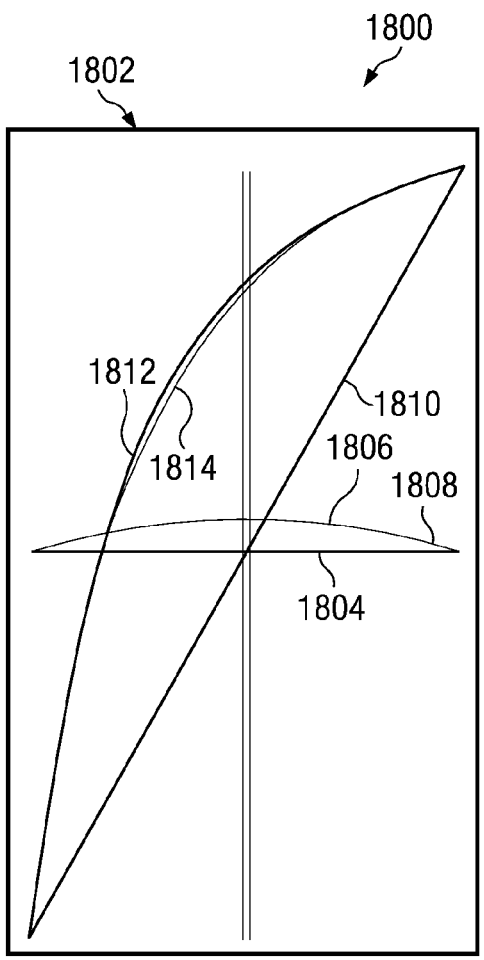
FIG. 18 is a diagram illustrating a great circle approximation used in a routing process in accordance with an advantageous embodiment of the present invention.

With reference now to FIG. 18, a diagram illustrating a great circle approximation used in a routing process is depicted in accordance with an advantageous embodiment of the present invention. In this example, the creation of the grid from regularly spaced latitude/longitude points produces straight lines on a Mercator-like projection. This type of grid results in a constant heading path known as a rumb-line as opposed to a great circle, which is the desired shortest path between two points on a sphere. In FIG. 18, a forty by forty degree area is shown centered at forty degrees latitude.

As can be seen in graph 1800, grid 1802 is projected in a manner such that the straight line in grid 1802 is near a great circle. In this example there are three paths: one vertical, one horizontal, and one diagonal. For the vertical path, the rumb-line, great circle path, and grid path match exactly. For the horizontal path, rumb-line 1804 diverges from great circle path 1806. Horizontal grid path 1808 matches great circle path 1806 so closely the difference on this graph is very minor. For the diagonal path, rumb-line 1810 significantly diverges from great circle path 1812. The differences between grid path 1814 and great circle path 1812 are insignificant for ship routing in these examples. The projection of grid 1802 onto the great circle is such that straight lines on grid 1802 are near great circle paths in geospatial coordinates.

This type of projection in FIG. 18 precludes a need for spherical trignometric calculations in the routing process. By eliminating the need for these types of calculations, the computational requirements in processing resources are reduced. After a route is found using grid 1802, the associated grid points are transformed into geospatial coordinates. The computational requirements for this type of transformation are negligible compared to the computations for great circle calculations in a loop within the routing process.

Figure 19:
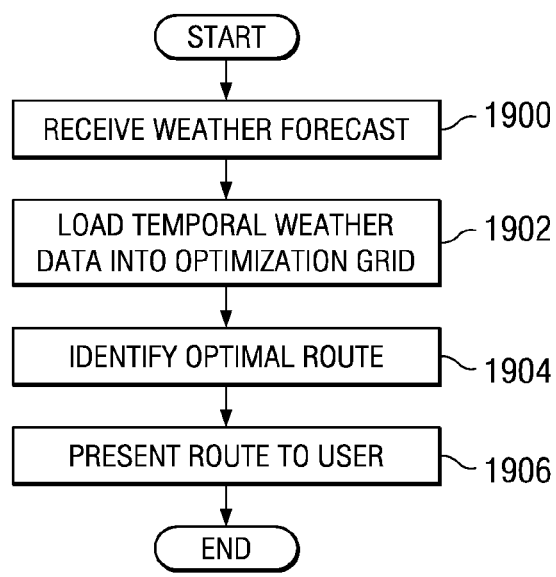
FIG. 19 is a flowchart of a process for generating a route for a vessel in accordance with an advantageous embodiment of the present invention.

With respect to FIG. 19, a flowchart of a process for generating a route for a vessel is depicted in accordance with an advantageous embodiment of the present invention. The process illustrated in FIG. 19 may be implemented using a routing process, such as that found in route analysis and planning tool 300 in FIG. 3.

The process begins by receiving a weather forecast (operation 1900). In the illustrative embodiments, the weather forecast includes a forecast of wave conditions over the different areas of interest. Additionally, the weather forecast also may include a forecast of wind conditions in addition to or in place of the wave conditions. Next, temporal weather data is loaded into an optimization grid (operation 1902). The optimization grid used in operation 1902 is a grid used by the routing process. Weather forecasts are received as grid data sets for this grid. In these examples, the weather forecast received covers the area of interest. A grid set is present for every grid point in time in the forecast data that is received. For example, the different grid sets may be 4 hour increments for the same area. In other words, one grid may be present for current conditions with a second grid being present for forecasted conditions 4 hours from the current time.

Another grid of forecasted data is present for conditions 8 hours from the current time. This data is re-sampled or placed into the optimization grid by the routing process for different points in time in routing a vessel. In these examples, each grid point in the optimization grid has a list of wave parameters sorted by forecast time. As a result, an entry in a list is present for each forecasted time slot for a particular grid point. In these examples, wave parameters are considered constant over the entire grid square for a given point in time for a particular grid point.

Next, an optimal route is identified (operation 1904). The optimal route identified in operation 1904 is described in more detail in FIG. 20 below. The route is then presented to a user (operation 1906) with the process terminating thereafter. At this point, the user may decide whether to use the suggested route. Of course, depending on the implementation, the optimal route may be automatically implemented into a navigation system for the vessel without user intervention.

Figure 20:
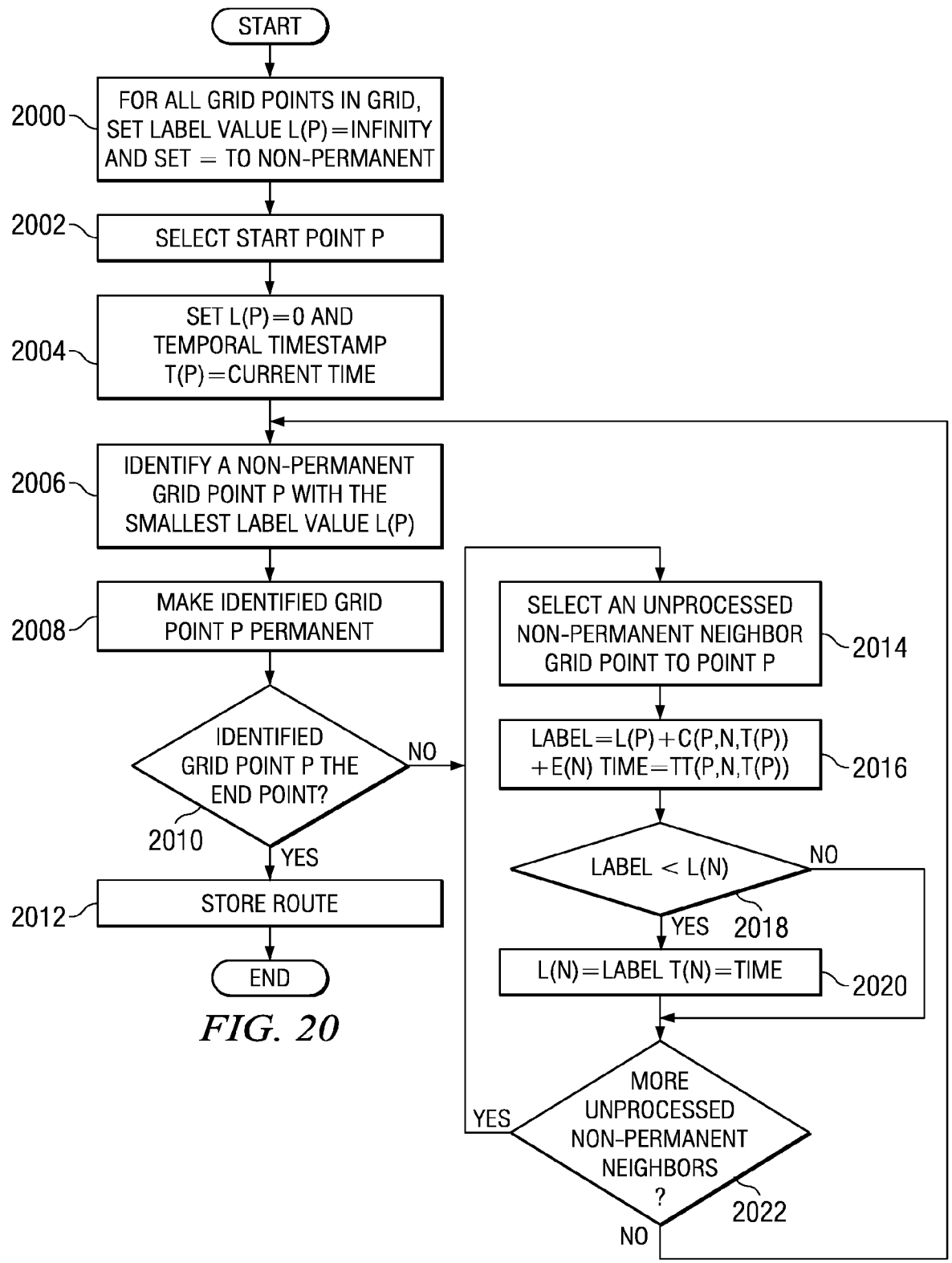
FIG. 20 is a flowchart of a process for identifying an optimal route in accordance with an advantageous embodiment of the present invention.

With reference now to FIG. 20, a flowchart of a process for identifying an optimal route is depicted in accordance with an advantageous embodiment of the present invention. The process in FIG. 20 is a more detailed illustration of operation 1904 in FIG. 19.

The process begins by setting a label value L(P) equal to infinity and setting equal to non-permanent for all grid points P in a grid (operation 2000). In this example, the grid represents the center of squares on a body of water to which a vessel may potentially travel. Thereafter, a start point P is selected (operation 2002). The label L(P) is set equal to 0 and the temporal timestamp for the grid point is set equal to current time (operation 2004).

Next, a non-permanent grid point P with the smallest label value L(P) is identified (operation 2006). The first time operation 2006 is performed, start point P is set equal to permanent because this label value has a value of 0 while all the other grid points have a label value of infinity. The identified grid point P is made permanent (operation 2008).

Thereafter, determination is made as to whether the identified grid point P is the end point (operation 2010). If the identified grid point P is the end point, the route is then stored (operation 2012) with the process terminating thereafter.

Otherwise, an unprocessed non-permanent neighbor grid point to grid point P is selected for processing (operation 2014). The variable LABEL for this selected non-permanent neighbor grid point is set equal to the L(P)+C(P,N,T(P))+E(N) and the time is set equal to TT(P,N,T(P)) (operation 2016). L(P) is the label value for the grid point made permanent in operation 2008. P represents grid point P that was made permanent in operation 2008. C(P,N,T(P)) is the cost to traverse from grid point P to grid point N starting with time T(P). N represents the neighbor grid point selected for processing in operation 2014. T is the time stamp for grid point P identified as the permanent grid point in operation 2008. TT(P,N,T(P)) is the time when the traversal from grid point P to grid point N completes that started at time T(P). Operation 2016 is described in more detail in FIG. 21 below.

Next, a determination is made as to whether the value of variable LABEL in operation 2016 is less than L(N) (operation 2018). L(N) is the label value for the neighbor grid point N selected for processing in operation 2014. In other words, a determination is made as to whether the value for the variable LABEL generated in operation 2016 is less than the label value for the neighbor being processed.

If variable LABEL is less than L(N), then the value of L(N) is set equal to the value for the variable LABEL and T(N) is set equal to the value of time as identified in operation 2016 (operation 2020). L(N) is the value for the neighbor being processed and T(N) is the temporal timestamp for the neighbor being processed.

Thereafter, a determination is made as to whether more unprocessed non-permanent neighbors to be identified point P in operation 2008 are present (operation 2022). If additional neighbor grid points are present, the process returns to operation 2014) to select another unprocessed non-permanent neighbor for processing. Otherwise, the process returns to operation 2006 to identify another non-permanent grid point P for processing.

With reference again to operation 2018, if the value of the variable LABEL is not less than L(N), the process then returns to operation 2022 as described above.

Figure 21:
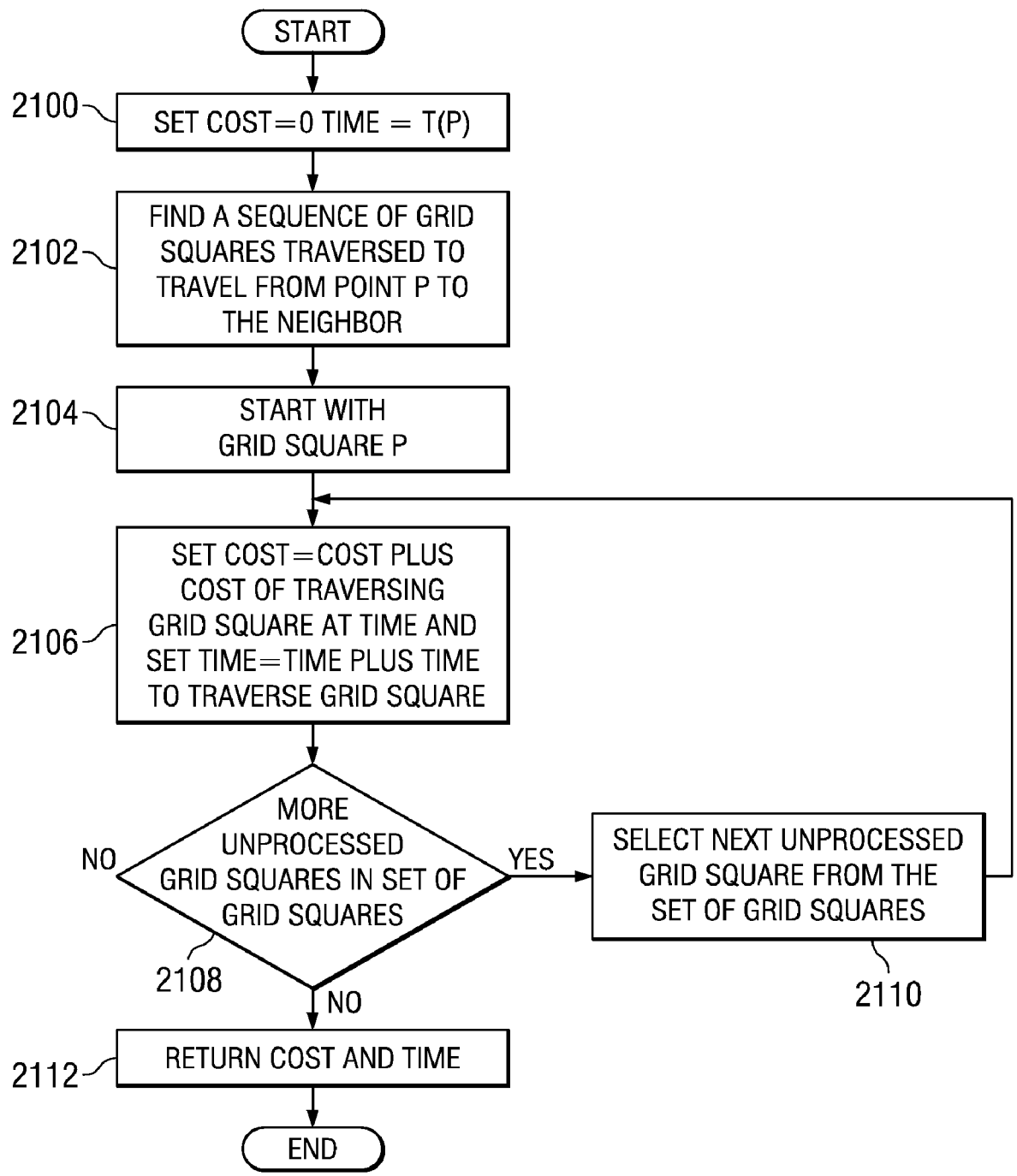
FIG. 21 is a flowchart of a process for identifying the cost to traverse from a grid point P to a neighbor in accordance with an advantageous embodiment of the present invention.

Turning next to FIG. 21, a flowchart of a process for identifying the cost to traverse from a grid point P to a neighbor is depicted in accordance with an advantageous embodiment of the present invention. The process illustrated in FIG. 21 is more detailed explanation of operation 2016 in FIG. 20.

The process begins by setting the variable COST equal to 0 and the variable time equal to T(P) (operation 2100). Thereafter, a sequence of squares that are crossed to traverse from point P to the neighbor is found (operation 2102). An example of this sequence of squares is found in FIG. 14. Thereafter, an unprocessed grid square is selected from a set of grid squares (operation 2104). In this example, the sequence of grid squares starts with the square containing grid point P (operation 2104). The grid squares are processed in order from grid point P to the neighbor grid point N in these depicted examples.

Next, the value of the variable COST is incremented with the cost of traversing the grid square at the value of the variable time. The value for the variable time is incremented with the value of the time to traverse the grid square that is being processed (operation 2106). A more detailed explanation of operation 2106 is found in the description of FIG. 22 below. In incrementing the value of the variable COST, the value of the variable COST is set equal to the current value of this variable plus the cost to traverse the grid square at time T. In incrementing the value for the variable TIME, the current value for this variable is added to the time needed to traverse the grid square.

Thereafter, a determination is made as to whether more unprocessed grid squares are present in the sequence of grid squares (operation 2108). As mentioned above, this set of grid squares is a sequence of grid squares that are traversed from grid point P to grid point N. If additional unprocessed grid squares are present, the process selects the next unprocessed grid square from the sequence of grid squares (operation 2108). The process then returns to operation 2106. Otherwise, the values for variable COST and TIME are returned (operation 2112) with the process terminating thereafter.

Figure 22:
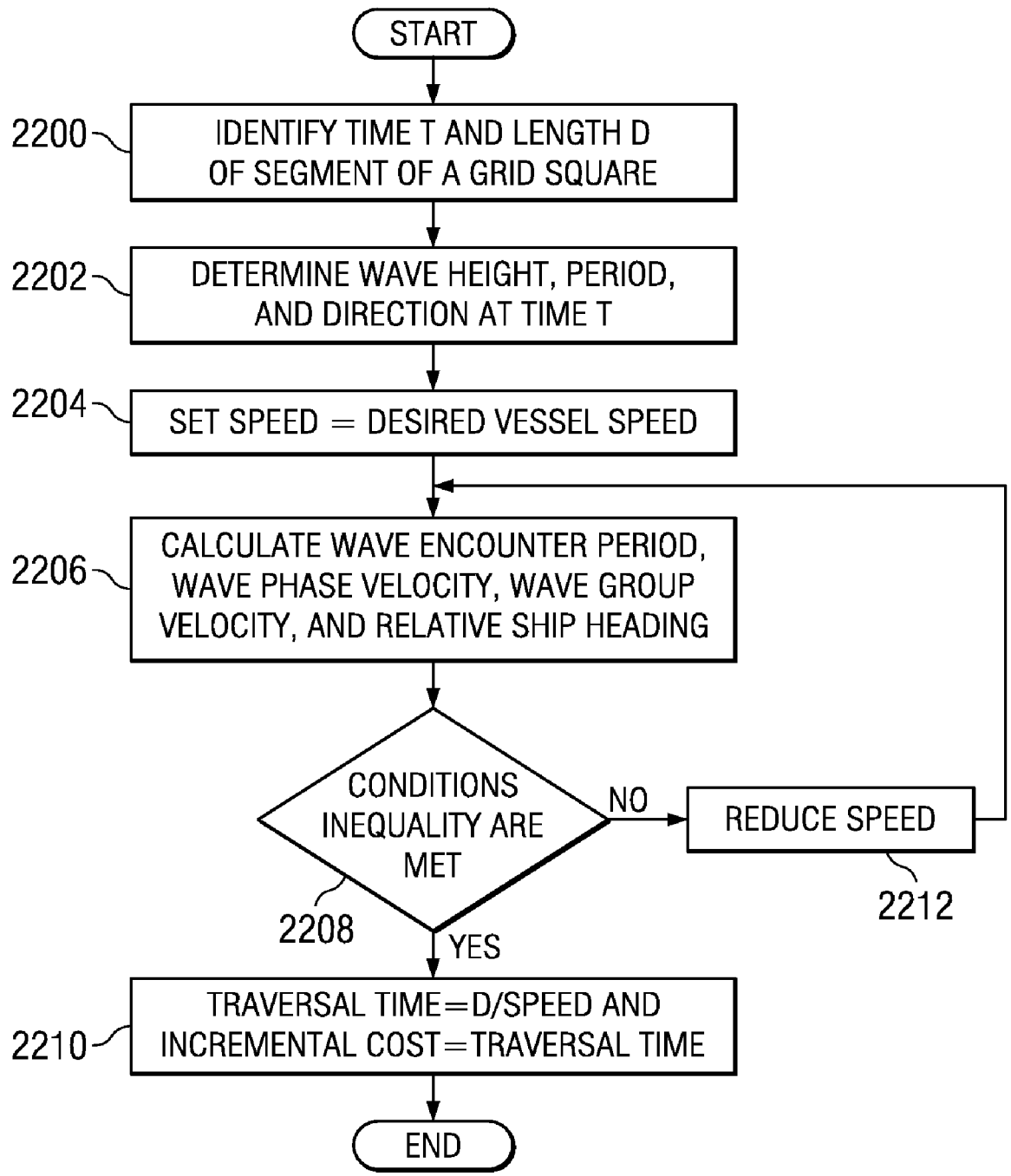
FIG. 22 is a flowchart of a process for identifying the cost of traversing a grid square and the time needed to traverse a grid square in accordance with an advantageous embodiment of the present invention.

With reference to FIG. 22, a flowchart of a process for identifying the cost of traversing a grid square and the time needed to traverse a grid square is depicted in accordance with an advantageous embodiment of the present invention. The process illustrated in FIG. 22 is a more detailed description of operation 2106 in FIG. 21.

The process begins by identifying time T and length D for the segment over a grid square (operation 2200). This segment in operation 2200 is the portion of the grid square that is traversed. The length of the segment may differ depending on where the vessel enters and exits the grid square. Next, the wave height, period, and direction of waves are identified at time T within the grid square (operation 2202). Thereafter, the variable SPEED is set equal to the desired vessel speed (operation 2204).

In these examples, the variable SPEED may be a desired speed for a vessel operator. This speed may be, for example, the fastest speed that the vessel can travel or the speed with the best fuel usage. Operation 2204 sets the variable SPEED equal to this desired speed. This variable may be altered in subsequent operations if a condition as described above with respect to waves is not met. The speed is reduced until conditions are met to avoid treacherous environments.

Then, the wave encounter period, wave phase velocity, wave group velocity, and relative vessel heading are calculated (operation 2206). Next, a determination is made as to whether conditions for inequality constraints are met (operation 2208). In these examples, the conditions and constraints may be those illustrated in FIG. 10. If the conditions are met, the traversal time is set equal to D divided by the value for the variable SPEED, and the incremental cost is set equal to the traversal time (operation 2210) with the process terminating thereafter.

With reference again to operation 2208, if the conditions are not met, the variable SPEED is reduced (operation 2212). The variable SPEED may be reduced at various increments depending on the particular implementation. These increments may vary depending on the particular implementation. Typically, the increments or amount used to reduce the variable speed may be one used to place the speed at an edge of each condition needed to avoid treacherous environments. From these different speeds, one may be a speed that satisfies all the different conditions needed to avoid treacherous environments. Thereafter, the process returns to operation 2206 as described above.

An example comparison of a trip from San Diego to Tokyo using both the current routing processes and the routing process in the advantageous embodiments of the present invention are depicted in FIGS. 23-26.

Figure 23:
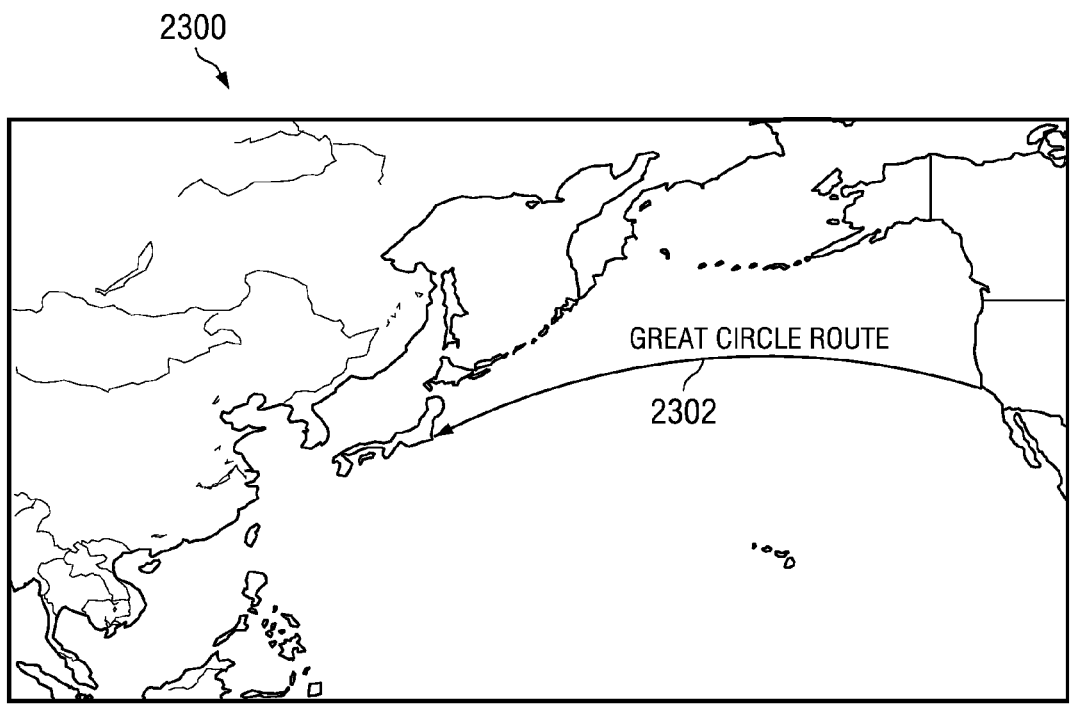
FIG. 23 is chart illustrating an example of a typical route in accordance with an advantageous embodiment of the present invention.

In FIG. 23, a chart of a route is depicted. In chart 2300 route 2302 is an example of a typical great circle route from San Diego to Tokyo. This is the route typically taken by vessels traveling between these two destinations using the current routing processes. A typical container vessel may cruise at a speed of twenty-five knots. This is the speed that may be maintained if unimpeded by bad weather. With this speed and with the absence of bad weather, the trip along route 2302 is expected to take eight days.

Figure 24:
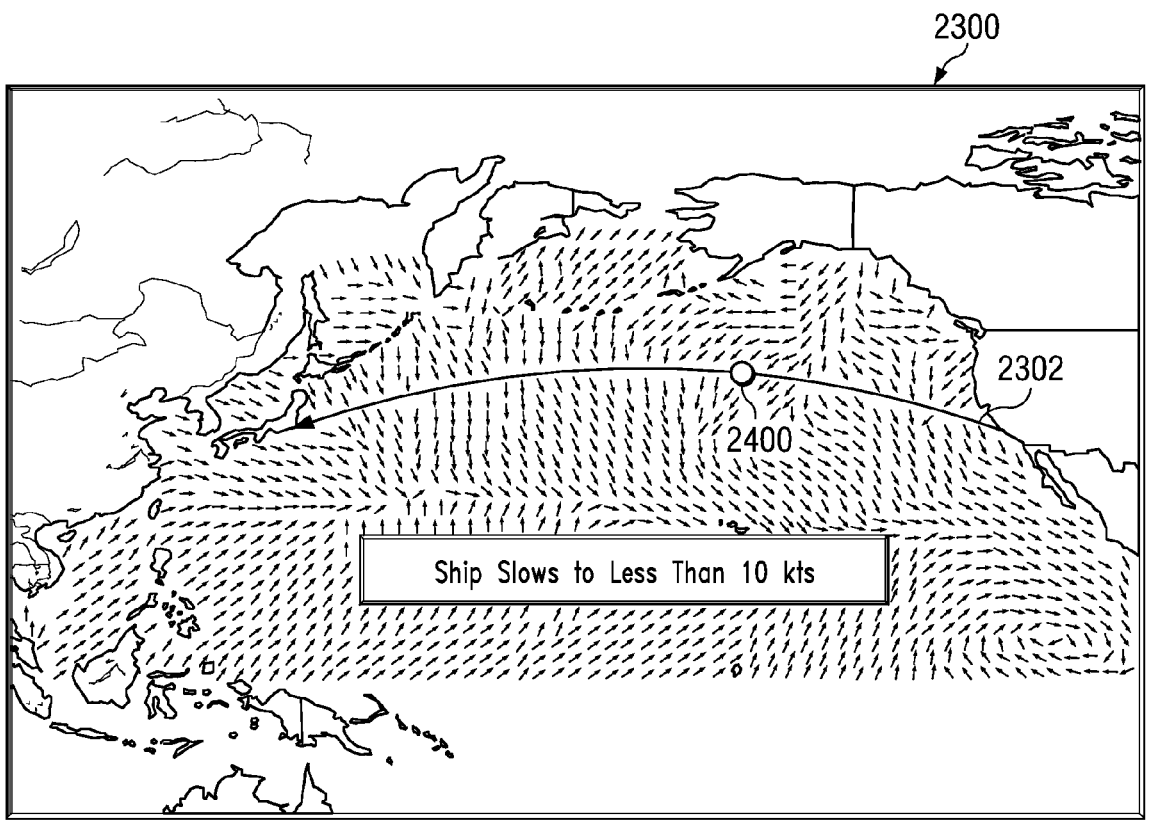
FIG. 24 is a chart illustrating weather conditions illustrating wave height and direction in accordance with an advantageous embodiment of the present invention.

With reference now to FIG. 24, weather conditions illustrating wave height and direction are depicted in chart 2300 when the vessel is at point 2400 along route 2302. With this type of condition, safety constraints based on conditions that form treacherous environments force the vessel to reduce its speed to a little bit less than ten knots.

Figure 25:
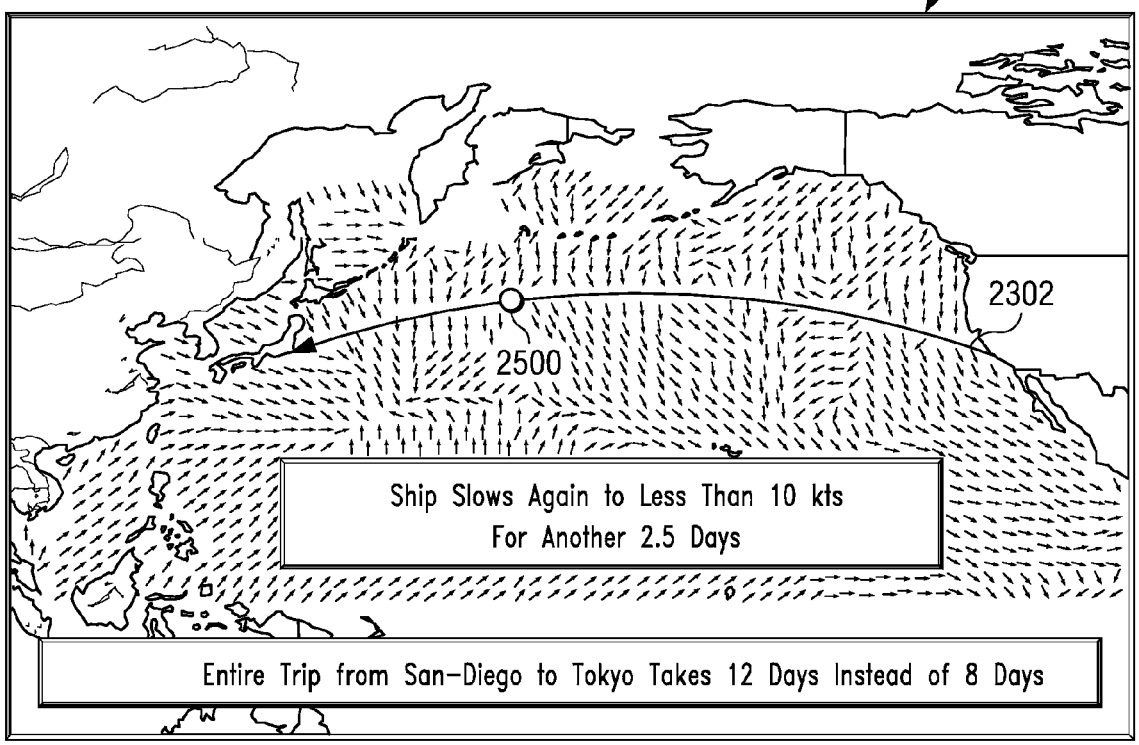
FIG. 25 is a chart illustrating another storm system creating a treacherous environment in accordance with an advantageous embodiment of the present invention.

With reference next to FIG. 25, a chart illustrating another storm system creating a treacherous environment is depicted. In FIG. 25, the vessel is again forced to reduce its speed to less than ten knots when the vessel reaches point 2500 along route 2302 in its trip from San Diego to Japan. As a result, the overall transit time is in excess of twelve days.

Figure 26:
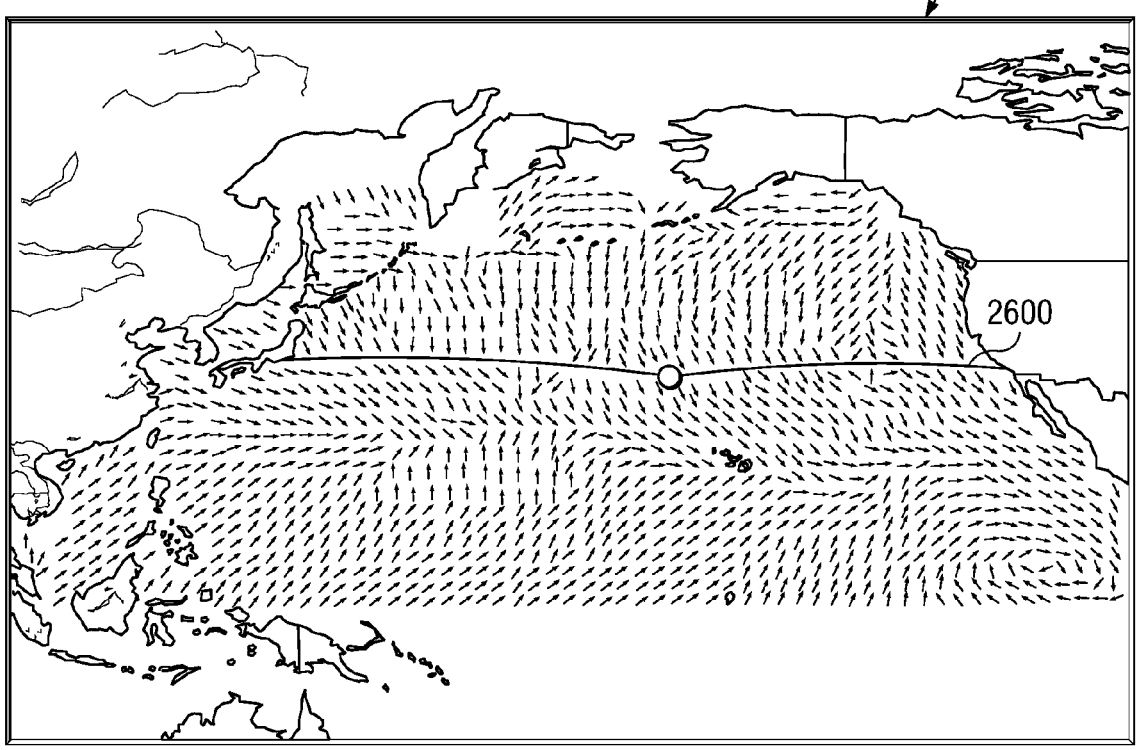
FIG. 26 is a diagram illustrating a route generated for travel from San Diego to Tokyo in accordance with an advantageous embodiment of the present invention.

Turning now to FIG. 26, a diagram illustrating a route generated for travel from San Diego to Tokyo in accordance with an advantageous embodiment of the present invention. In this illustrative example, a routing process, such as that found in route analysis and planning tool 300 is employed to generate route 2600 for chart 2602. Route 2600 is not a great circle such as route 2302 in FIG. 23. This route, however, avoids treacherous conditions and allows the vessel to maintain a speed of twenty-five knots.

As a result, the vessel reaches Tokyo in eight days and eight hours, which is only eight hours longer than if the bad weather had not occurred. Saving three days and sixteen hours may result in a large cost savings. For example, if the cost is $60,000 an hour, the savings is almost $256,000 through using the routing process of the advantageous embodiments of the present invention.

In these examples, the optimization of a route is based on transit time. The travel or transit time is minimized in the illustrative embodiments based on the factor of the cost as a basis of time. Of course, other factors may be taken into account that may not result in the fastest transit time. For example, fuel consumption may be another factor. In the performance model for a vessel, fuel consumption may be great enough when speeds over a certain threshold are exceeded that the reduction in transit time does not reduce the cost. As a result, taking this factor into account along with transit time may result in a route that provides the lowest cost, but is not the fastest route.

Thus, the different advantageous embodiments of the present invention provide a computer implemented method, apparatus, and computer usable program code for generating a route for a vessel. A forecast of weather conditions is obtained. A set of parameters for the vessel also are obtained. These parameters are used to calculate a response of the vessel to the forecast of the weather conditions. A route is then generated from a start point to an end point for the vessel using the set of parameters for the vessel and the forecast of the weather conditions. This route avoids treacherous environments for a vessel traveling from the start point to the end point.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Further, different advantageous embodiments may provide different advantages as compared to other advantageous embodiments. Many modifications and variations will be apparent to those of ordinary skill in the art. For example, the routing process in the different examples uses Dijkstra's algorithm to select a route. Other processes or routing algorithms may be used depending on the particular implementation.

The use of Dijkstra's algorithm is not meant to limit the different present invention to this particular process. Although these different examples are presented in which grid points are center points for grid squares, the routing process could be applied to other types of shapes, such as a hexagon. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating a route for a vessel to travel from a start point to and end point, the computer implemented method comprising:
   identifying a start point and an end point for the vessel;
   obtaining a forecast of wave conditions during a period of time;
   obtaining a model of the vessel, wherein the model includes parameters used to calculate a response of the vessel to the wave conditions; and
   generating a route from the start point to the endpoint for the vessel to travel on using the model of the vessel and the forecast of the wave conditions, using Dijkstra's algorithm with minimum angular resolution, and wherein the route avoids a treacherous environment and meets a set of goals.

2. The computer implemented method of claim 1, wherein the generating step comprises:
   generating the route from the start point to the end point for the vessel to traverse using the model of the vessel and the forecast of the wave conditions using Dijkstra's algorithm with minimum angular resolution, wherein the route avoids treacherous conditions with a lowest cost to travel from the start point to the end point.

3. The computer implemented method of claim 2, wherein the set of goals is a lower cost to travel from the start point to the end point.

4. The computer implemented method of claim 1, wherein the start point is a grid point and is assigned a label value of zero and wherein the generating step comprises:
   designating a non-permanent grid point with a smallest label value as a permanent grid point;
   generating label values for a plurality of neighbor grid points that are non-permanent, wherein the each label value in the label values represents a cost to traverse from the permanent grid point to a neighbor grid point; and
   repeating the designating and generating steps until the end point is reached.

5. The computer implemented method of claim 4, wherein the label value in the label values is generated as:

$$\text{Label} = L(P) + C(P, N, T(P)) + E(P),$$

wherein Label is the label value, $L(P)$ is a label value for the permanent grid point, $C(P, N, T(P))$ is a cost of traveling from the permanent grid point to a selected neighbor grid point starting at a selected time, and $E(P)$ is an estimated cost to traverse a great circle route between the permanent grid point and the end point.

6. The computer implemented method of claim 5, wherein the cost to move from the permanent grid point to the neighbor grid point is based on a time to move from the permanent grid point to the neighbor grid point in which the vessel moves at a speed that avoids a set of conditions that cause the treacherous environment.

7. The computer implemented method of claim 6, wherein the set of conditions causing the treacherous environment comprises at least one of synchronous rolling, parametric rolling, surf-riding and broaching-to, and successive high wave attack.

8. The computer implemented method of claim 1 further comprising:

responsive to an event, repeating the steps of obtaining the forecast of wave conditions during a period of time; obtaining a model of the vessel, wherein the model includes parameters used to calculate a response of the vessel to the wave conditions; and generating a route from a starting point to an end point for the vessel using the model of the vessel and the forecast of the wave conditions, wherein the route avoids the treacherous environment.

9. The computer implemented method of claim 8, wherein the event is a periodic event.

10. The computer implemented method of claim 8, wherein the event is receipt of an updated forecast of the wave conditions during the period of time.

11. A computer implemented method for generating a route for a vessel, the computer implemented method comprising:

obtaining a forecast of weather conditions;

obtaining a set of parameters for the vessel, wherein the set of parameters are used to calculate a response of the vessel to forecast of the weather conditions; and generating a route from a starting point to an end point for the vessel using the set of parameters for the vessel and the forecast of the weather conditions, wherein the route avoids treacherous environment when traveling from the start point to the end point, and wherein the generating step comprises selecting a next point to travel to in the route from a current point, wherein the next point is selected from a plurality of neighbor points and the next point is a neighbor point in the plurality of points that has a lower cost to travel to from the current point in which a set of conditions that cause the treacherous environment is avoided; and repeating the selecting step until the end point for the route is reached to form the route.

12. The computer implemented method of claim 11, wherein the route has a lowest cost in addition to avoiding the treacherous environment.

13. The computer implemented method of claim 11 further comprising:

repeating the generating step each time a new forecast of weather conditions is obtained to generate an updated route.

14. The computer implemented method of claim 11, wherein the forecast of weather conditions is at least one of wave conditions and wind conditions.

15. A computer program product comprising:

a computer usable medium computer usable program code, stored on the computer usable medium, for obtaining a forecast of weather conditions;

computer usable program code, stored on the computer usable medium, for obtaining a set of parameters for the vessel, wherein the set of parameters are used to calculate a response of the vessel to forecast of the weather conditions; and computer usable program code, stored on the computer usable medium, for generating a route from a starting point to an end point for the vessel using the set of parameters for the vessel and the forecast of the weather conditions, using Dijkstra's algorithm with minimum angular resolution, and wherein the route avoids a treacherous environment when traveling from the start point to the end point.

16. The computer program product of claim 15, wherein the route has a lowest cost in addition to avoiding the treacherous environments.

17. The computer program product of claim 15, wherein the computer usable product code, stored on the computer usable medium, for generating a route from a starting point to an end point for the vessel using the set of parameters for the vessel and the forecast of the weather conditions, wherein the route avoids treacherous environment when traveling from the start point to the end point comprises:

computer usable program code, stored on the computer usable medium, for selecting a next point to travel to in the route from a current point, wherein the next point is selected from a plurality of neighbor points and the next point is a neighbor point in the plurality of points that has a lowest cost to travel to from the current point in which a set of treacherous conditions is avoided; and computer usable program code, stored on the computer usable medium, for repeating execution of the computer usable program code for selecting until the end point for the route is reached to form the route.

18. The computer program product of claim 15 further comprising:

computer usable program code, stored on the computer usable medium, for repeating initiation of the computer usable program code for generating a route from a starting point to an end point for the vessel using the set of parameters for the vessel and the forecast of the weather conditions, wherein the route avoids the treacherous environment when traveling from the start point to the end point each time a new forecast of weather conditions is obtained to generate an updated route.

19. The computer program product of claim 15, wherein the forecast of weather conditions is at least one of wave conditions and wind conditions.

* * * * *